(12) United States Patent
Konno et al.

(10) Patent No.: US 9,304,365 B2
(45) Date of Patent: Apr. 5, 2016

(54) LATERAL ELECTRIC FIELD TYPE LIQUID CRYSTAL DISPLAY DEVICE

(71) Applicant: NLT Technologies, Ltd., Kawasaki, Kanagawa (JP)

(72) Inventors: Takayuki Konno, Kanagawa (JP); Shinichi Nishida, Kanagawa (JP)

(73) Assignee: NLT TECHNOLOGIES, LTD., Kawasaki (JP)

( * ) Notice: Subject to any disclaimer, the term of this patent is extended or adjusted under 35 U.S.C. 154(b) by 69 days.

(21) Appl. No.: 14/455,515

(22) Filed: Aug. 8, 2014

(65) Prior Publication Data

US 2015/0042911 A1 Feb. 12, 2015

(30) Foreign Application Priority Data

Aug. 12, 2013 (JP) .................. 2013-167294

(51) Int. Cl.
*G02F 1/1343* (2006.01)
*G02F 1/1362* (2006.01)

(52) U.S. Cl.
CPC .... *G02F 1/134363* (2013.01); *G02F 1/136213* (2013.01); *G02F 2001/134345* (2013.01); *G02F 2001/134372* (2013.01)

(58) Field of Classification Search
CPC .............. G02F 1/134363; G02F 2001/134345; G02F 2001/134372; G02F 1/136213
See application file for complete search history.

(56) References Cited

FOREIGN PATENT DOCUMENTS

| JP | 2008-191669 A | 8/2008 |
| JP | 4603560 B2 | 12/2010 |
| JP | 2012-022344 A | 2/2012 |

*Primary Examiner* — Joseph L Williams
(74) *Attorney, Agent, or Firm* — Sughrue Mion, PLLC

(57) ABSTRACT

A lateral electric field type liquid crystal display device includes a pixel electrode and a common electrode made with a transparent conductive film formed on different layers on a first substrate via an insulating film. Each pixel is divided into a first region and a second region. In the first region, the pixel electrode and the common electrode formed linearly substantially in parallel to each other rotate liquid crystal molecules in the region by a lateral electric field applied between the both electrodes. In the second region, at least the electrode on a lower layer side out of the pixel electrode and the common electrode is in a plan shape, and a part where the pixel electrode and the common electrode overlap with each other forms a storage capacitance.

9 Claims, 25 Drawing Sheets

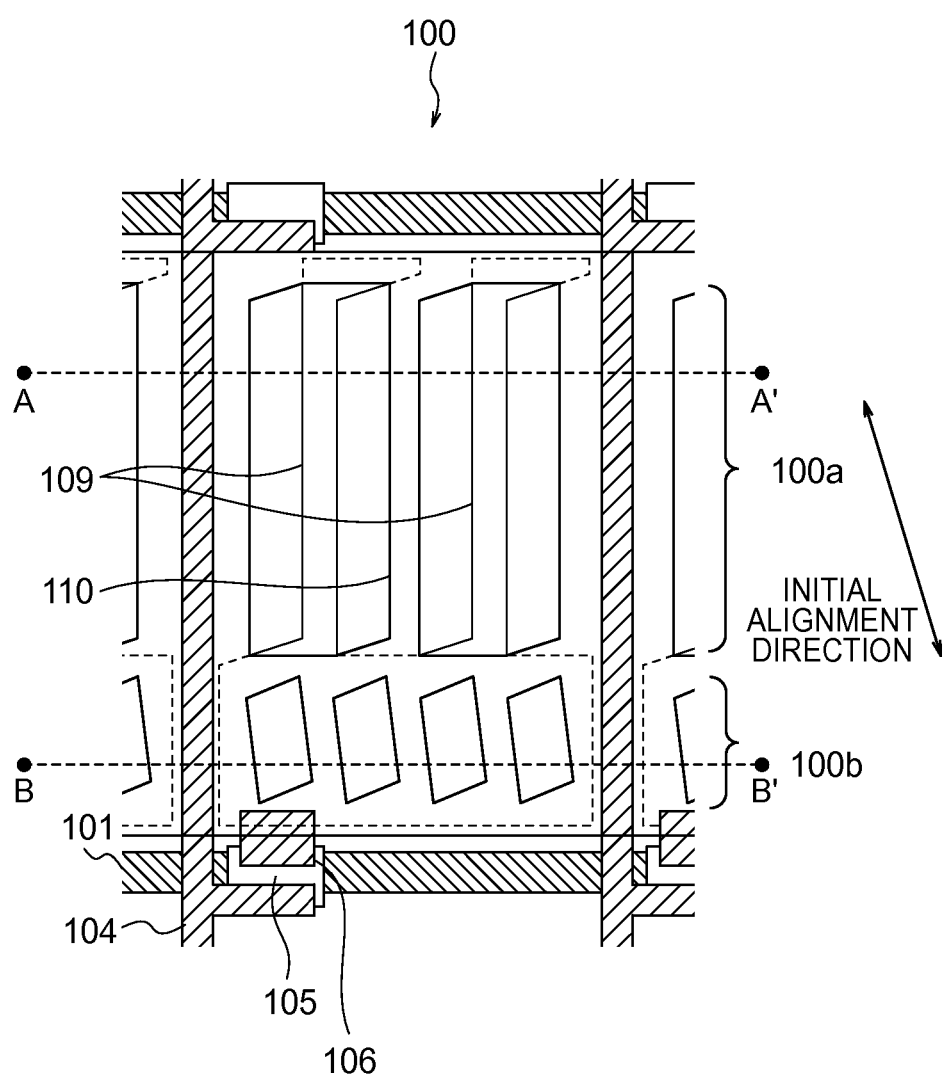

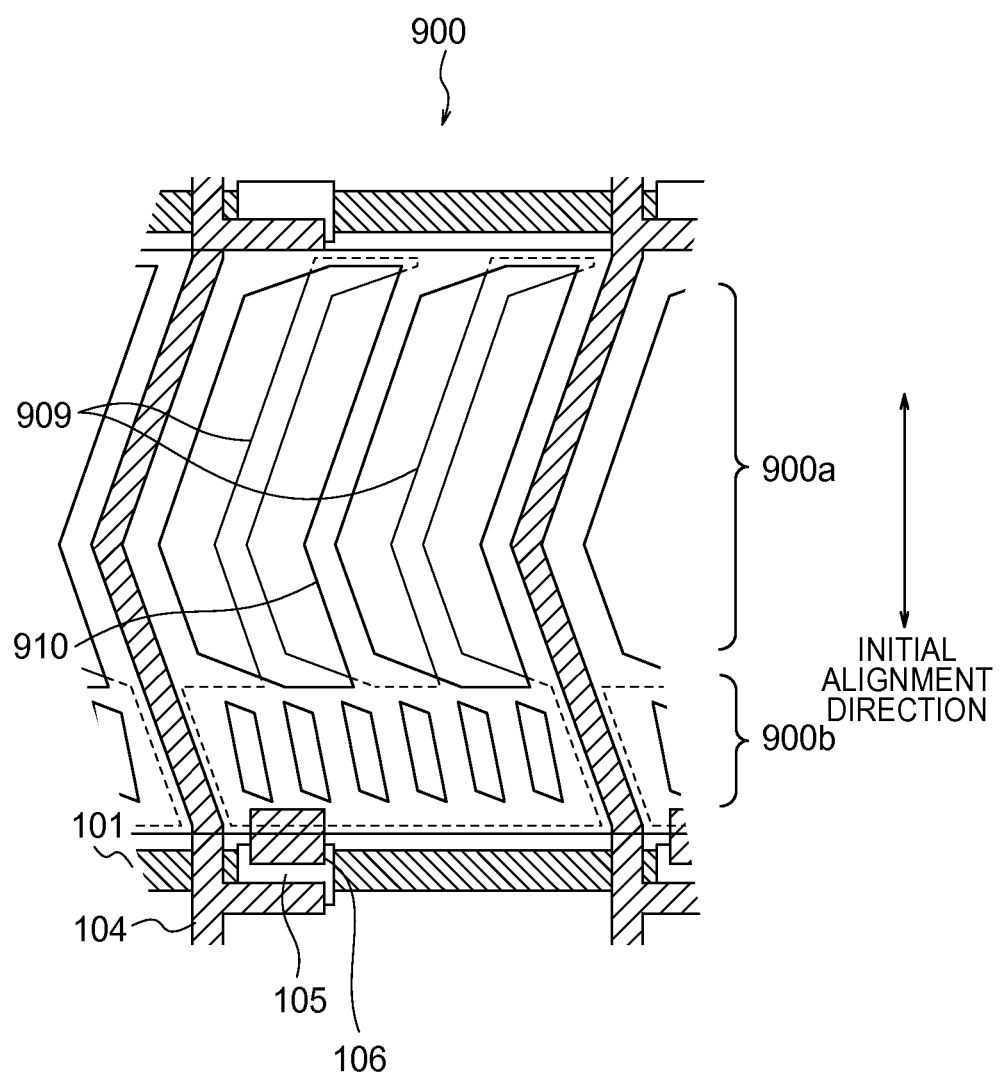

LATERAL ELECTRIC FIELD TYPE LIQUID CRYSTAL DISPLAY DEVICE

CROSS-REFERENCE TO RELATED APPLICATION

This application is based upon and claims the benefit of priority from Japanese patent application No. 2013-167294, filed on Aug. 12, 2013, the disclosure of which is incorporated herein in its entirety by reference.

BACKGROUND OF THE INVENTION

1. Field of the Invention

The present invention relates to a lateral electric field type liquid crystal display device and, more specifically, to a lateral electric field type liquid crystal display device with high luminance and wide viewing angles.

2. Description of the Related Art

Regarding the liquid crystal display devices especially in these days, widely employed is an IPS (In-Plane Switching) mode with which axes of liquid crystal molecules are rotated within a plane in parallel to the substrate by a lateral electric field. The IPS mode has almost no visual angle dependency for the angle of the rise of the molecule axes so that there is such an advantage that wide viewing angles can be acquired. Therefore, it is used broadly in large-screen television receivers, mobile phones, tablet terminals, and the like.
(Existing Technique 1)

FIG. 11 shows explanatory charts showing an existing liquid crystal display device 1010 with the IPS mode, which is also depicted in JP Patent No. 4603560 (Patent Document 1 (p. 8, FIG. 1)). The liquid crystal display device 1010 includes a liquid crystal display panel 1011, and pixels 1100 are arranged in matrix on the liquid crystal display panel 1011. FIG. 11A shows the external appearance of the liquid crystal display device 1010, FIG. 11B is an enlarged plan view of the pixel 1100, and FIG. 11C shows a sectional view taken along a line A-A' of FIG. 11B, respectively.

In the pixel 1100, a scan signal wiring 1101 constituted with a first metal layer and two parallel common signal wirings 1102 are formed on a first glass substrate 1118. A first insulating film 1103 is formed on the scan signal wiring 1101 and the common signal wirings 1102, and a video signal wiring 1104 constituted with a second metal layer, a thin film transistor 1105, and a source electrode 1106 are formed on the first insulating film 1103.

A second insulating film 1107 made with an inorganic film is formed on the video signal wiring 1104, the thin film transistor 1105, and the source electrode 1106. Further, a third insulating film 1108 made with an organic film is formed on the second insulating film 1107.

Further, a comb-like pixel comb electrode 1109 and a comb-like common comb electrode 1110 made with a transparent conductive film are formed on the third insulating film 1108. Furthermore, it is also possible to employ a structure in which the pixel comb electrode 1109 and the common comb electrode 1110 are formed on the second insulating film 1107 without using the third insulating film 1108.

The video signal wiring 1104 is completely covered by the common electrode 1110 in the wiring width direction via the second insulating film 1107 and the third insulating film 1108. The pixel electrode 1109 and the common electrode 1110 are electrically connected to the source electrode 1106 and the common signal wiring 1102 via contact holes 1111 and 1112, respectively. The region where the common signal wiring 1102 and the source electrode 1106 overlap with each other becomes a storage capacitance.

Further, since the comb-like pixel electrode 1109 and the comb-like common electrode 1110 are both made with a transparent conductive film, the regions on the electrode also contribute to the transmittance. Employed herein is the structure in which the video signal wiring 1104 is completely covered by the common electrode 1110, so that it is possible to widen the aperture part to the vicinity of the video signal wiring 1104.

As a second substrate, a light shielding layer 1117, a color layer 1116 (R, G, B), and an overcoat layer 1115 are formed on a second glass substrate 1119 in this order. It is unnecessary to form a color layer for the case of monochrome display.

Alignment layers 1113 and 1114 are applied and calcined on the first substrate and the second substrate, respectively. After performing rubbing processing thereon in a prescribed direction, the first substrate and the second substrate are superimposed on one another, and a liquid crystal layer 1122 is sandwiched therebetween with a prescribed gap provided by a spacer. Polarization plates 1120 and 1121 are laminated on the outer side of the first substrate and the second substrate, respectively.

As other related techniques, there are following documents. Japanese Unexamined Patent Publication 2012-022344 (Patent Document 2) and Japanese Unexamined Patent Publication 2008-191669 (Patent Document 3) both disclose a liquid crystal display device which employs an FFS (Fringe-Field Switching) mode in a part of the IPS mode. Details thereof will be described in the latter section of "the problem to be solved by the present invention".

With the technique of Patent Document 1 described above, it is possible to acquire a liquid crystal display device with high luminance by setting the aperture ratio relatively high while acquiring wide viewing angles by the IPS mode.

However, with this technique, the storage capacitance is formed by the overlapped part of the common signal wiring and the source electrode. Thus, it is required to form the common signal wiring in parallel to the scan signal wiring. Further, it is required to secure the storage capacitance also for the source electrode, so that the area cannot be reduced. Therefore, the aperture ratio in the vertical direction (i.e., luminance) cannot be improved.

In the meantime, a structure of the liquid crystal display device in which one out of the pixel electrode and the common electrode is formed as a plan-shape electrode and the other is formed as a linear-shape electrode, and the linear-shape electrode is disposed on the plan-shape electrode via an insulating film is referred to as an FFS (Fringe-Field Switching) mode.

With this mode, there is necessarily the region where the pixel electrode and the common electrode overlap with each other. Thus, the storage capacitance can be secured by using that part, so that the aperture part can be secured widely. However, the vertical component of the electric field is stronger in the FFS mode compared to that of the IPS mode, so that rise of the liquid crystal molecules becomes greater. Thus, it is inferior in terms of the viewing angles.

Therefore, it has been tried in some cases in the past to acquire a liquid crystal display device which exhibits the merits of each of the modes in terms of the viewing angles and the aperture ratio by combining the structures of the both of the IPS mode and the FFS mode.
(Existing Technique 2)

In Patent Document 2 (p. 20, FIG. 2), depicted is a transflective liquid crystal display device in which the transmissive region of the pixel is the IPS mode and the reflective region thereof is the FFS mode. This structure is targeted to improve the display quality of the reflective region but not targeted to improve the aperture ratio in the vertical direction.

Further, in the liquid crystal display device depicted in Patent Document 2, the entire reflective part is the FFS mode and the proportion of the area thereof is close to ½ of the entire display unit. Furthermore, the pixel electrode is made with two kinds of different materials, i.e., the reflective part is made with a metal layer and the transmissive part is made with a transparent conductive layer. Thus, a connection part is required between the both. Therefore, it is not possible to increase the light use efficiency by improving the aperture ratio and to acquire a liquid crystal display device of high luminance.

(Existing Technique 3)

In Patent Document 3 (p. 13, FIG. 1A), depicted is a transmissive type liquid crystal display device in which the both ends on the left and right sides of the pixel are in the IPS mode and the center part thereof is in the FFS mode.

The FFS mode is dominant in this structure, so that it is not possible to make the best use of the advantage of the viewing angle property of the IPS mode. Further, since the IPS mode part and the FFS mode part are divided along the direction of the FFS linear electrode, the IPS mode part and the FFS mode part cannot be optimized individually. Therefore, the advantages of each of the modes cannot be fully exhibited.

It is therefore an exemplary object of the present invention to provide a lateral electric field type liquid crystal display device which can achieve both the wide viewing angles and the high luminance by effectively combining the structures of the both modes called the IPS mode and the FFS mode.

SUMMARY OF THE INVENTION

In order to achieve the foregoing object, the lateral electric field type liquid crystal display device according to an exemplary aspect of the invention is a liquid crystal display device which includes a liquid crystal display panel having a great number of pixels arranged in matrix, which is formed by sandwiching a liquid crystal member between a first substrate and a second substrate, wherein: a pixel electrode and a common electrode made with a transparent conductive film are formed on the first substrate via an insulating film; each of the pixels is divided into a first region and a second region; the pixel electrode and the common electrode formed linearly in parallel to each other in the first region rotate liquid crystal molecules in the region by a lateral electric field applied between the both electrodes; and at least the electrode on a lower layer side out of the pixel electrode and the common electrode in the second region is formed in a plan shape, and a part where the pixel electrode and the common electrode overlap with each other forms a storage capacitance.

BRIEF DESCRIPTION OF THE DRAWINGS

FIG. 1B is an enlarged plan view of a pixel of the liquid crystal display device according to the first exemplary embodiment of the present invention;

FIG. 10B is an enlarged plan view of a pixel of the liquid crystal display device according to the ninth exemplary embodiment of the present invention;

DETAILED DESCRIPTION OF THE PREFERRED EMBODIMENTS

First Exemplary Embodiment

Figure 1A:
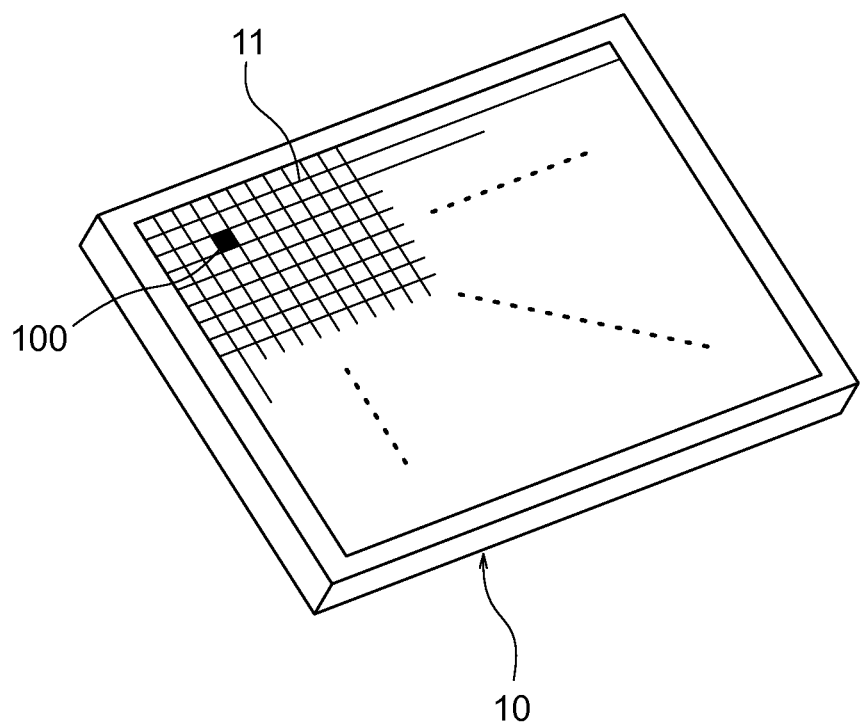
FIG. 1A is an explanatory chart showing the external appearance of a liquid crystal display device according to a first exemplary embodiment of the present invention.

The structure of a first exemplary embodiment of the present invention will be described by referring to FIGS. 1A-1C.

A liquid crystal display device 10 according to this exemplary embodiment is a lateral electric field type liquid crystal display device which includes a liquid crystal display panel 11 having a great number of pixels 100 arranged in matrix constituted by sandwiching a liquid crystal member by a first and a second substrates (a first glass substrate 118, a second glass substrate 119). A pixel electrode 109 and a common electrode 110 made with a transparent conductive film formed on different layers are provided on the first substrate via an insulating film 107, and each pixel is divided into a first region and a second region (a first region 100a, a second region 100b). In the first region, the pixel electrode 109 and the common electrode 110 formed linearly in parallel to each other rotate the liquid crystal molecules in the region by a lateral electric field applied between the both electrodes. In the second region, at least the electrode on the lower layer side (the pixel electrode 109 in this embodiment) out of the pixel electrode and the common electrode is in a plan shape and overlaps with the upper layer side (the common electrode 110 in this embodiment). The storage capacitance is formed by the overlapped part of the pixel electrode and the common electrode.

Further, on the first substrate, at least provided are: a scan signal wiring 101; a video signal wiring 104 intersecting with the scan signal wiring; a thin film transistor 105 formed in the vicinity of the intersection between the scan signal wiring and the video signal wiring; and a source electrode 106 connected to the thin film transistor 105. The video signal wiring is covered by the common electrode in the wiring width direction via the insulating film.

Further, the border line between the first and the second regions is set in such a manner that the angle with respect to the extending direction of the linearly formed electrode in the first region adjacent to the border is different from the angle with respect to the extending direction of the linearly formed electrode in the second region and that each of those angles is 45 degrees or more. Further, the proportion of the area of the second region is ¼ or less than the total area of the first and second regions.

Furthermore, the lower layer side pixel electrode 109 out of the pixel electrode 109 and the common electrode 110 in the second region 100b is in a plan shape, and the upper layer side common electrode 110 is formed linearly to overlap with the lower layer side electrode. The overlapped part of the pixel electrode and the common electrode forms the storage capacitance while rotating the liquid crystal molecules by the lateral electric field applied between the both electrodes. Further, the angle between the initial alignment direction of the liquid crystal molecules and the extending direction of the common electrode formed linearly in the first region and the angle between the initial alignment direction of the liquid crystal molecules and the extending direction of the electrode formed linearly in the second region are different. In the present invention, the tilt angle is optimized for each of the IPS mode and the FFS mode through changing the angles of the extending directions of the linearly formed electrodes in each of the regions without changing the initial alignment of the liquid crystal molecules for the first and second regions. The details thereof will be described later.

With the above-described structure, the liquid crystal display device 10 becomes capable of acquiring both the wide viewing angles and the high luminance by effectively combining the structures of both the IPS mode and the FFS mode. Hereinafter, this will be described in more details.

Figure 1C:
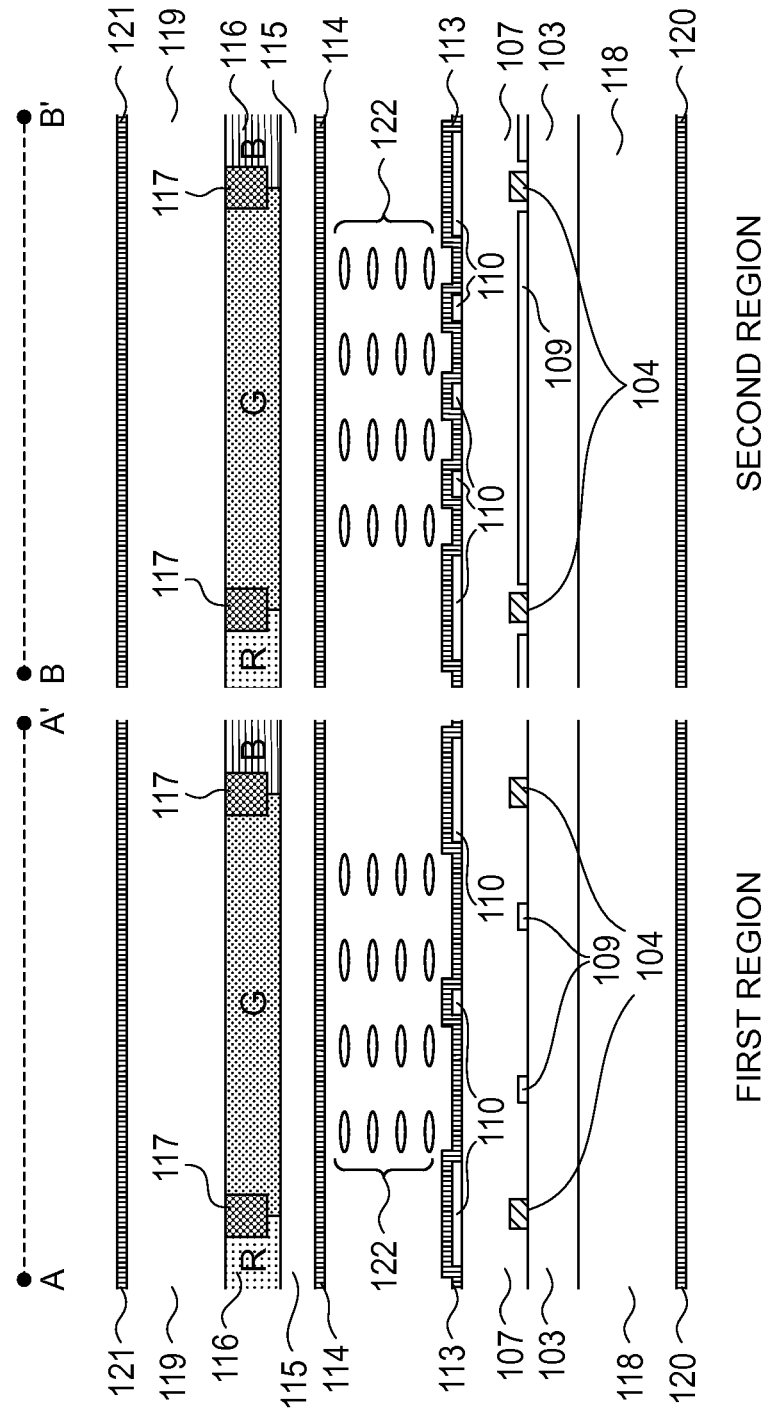
FIG. 1C is a sectional view taken along a line A-A' and a line B-B' of FIG. 1B.

FIGS. 1A-1C are explanatory charts showing the structure of the liquid crystal display device 10 according to the first exemplary embodiment of the present invention. The liquid crystal display device 10 includes the liquid crystal display panel 11, and a great number of pixels 100 are arranged in matrix on the liquid crystal display panel 11. FIG. 1A shows the external appearance of the liquid crystal display device 10, FIG. 1B is an enlarged plan view of the pixel 100, and FIG. 1C is a sectional view taken along the line A-A' (the first region 100a) and along the line B-B' (the second region 100b) of FIG. 1B.

Note that the elements (e.g., a backlight, a control circuit) other than the liquid crystal display panel 11 of the liquid crystal display device 10 are not in the scope of rights of the present invention and it is not necessary to mention those for describing the present invention, so that those elements are not shown in the drawings. This is the same for the exemplary embodiments described hereinafter.

The manufacture steps thereof will be described. First, the scan signal wirings 101 constituted with a first metal layer are formed by stacking an alloy having molybdenum as the main component and an alloy having aluminum as the main component on the first glass substrate 118. After forming a silicon nitride film as a first insulating film 103 thereon, the thin film transistor 105 is formed.

Thereafter, the pixel electrode 109 is formed by using a transparent conductive film such as ITO (Indium Tin Oxide). The pixel electrode 109 is in a linear shape on the first region 100a on the upper side, while it is in a plan shape in the second region 100b.

As a second metal layer, the video signal wiring 104 and the source electrode 106 of the thin film transistor are formed thereon by a metal layer in which an alloy having molybdenum as the main component and an alloy having aluminum as the main component are stacked. The source electrode 106 is electrically connected to the pixel electrode 109.

Further, an n-type semiconductor layer is formed on the upper layer of the thin film transistor 105. The n-type semiconductor layer in the areas other than the source/drain electrode is removed by dry etching after forming the electrodes constituted with a second metal layer. Further, the second insulating film 107 made with silicon nitride is formed thereon.

Then, the common electrode 110 is formed on the second insulating film 107 by using a transparent conductive film such as ITO. The common electrode 110 is in a linear shape in the first region 100a and disposed at alternate positions so as not to overlap with the pixel electrode 109. In the second region 100b, the linear common electrode 110 overlaps with the plan shape pixel electrode 109. Further, the common electrode 110 is formed to cover the video signal wiring 104 in the width direction to shield the electric field from the video signal wiring 104.

The second substrate is constituted by forming the light shielding layer 117, the color layer 116 (R, G, B), and the overcoat layer 115 in this order on the second glass substrate 119. In the case of monochrome display, the color layer 116 is unnecessary.

Alignment layers 113 and 114 are applied and calcined on the first substrate and the second substrate, respectively. After performing rubbing processing thereon in a prescribed direction, the first substrate and the second substrate are superimposed on one another, and a liquid crystal layer 122 is sandwiched therebetween with a prescribed gap provided by a spacer. Polarization plates 120 and 121 are laminated on the outer side of the first substrate and the second substrate, respectively.

Through the above, the first region 100a is formed as the IPS mode and the second region 100b is formed as the FFS mode.

In the second region 100*b* in the FFS mode, the overlapped part of the pixel electrode 109 and the common electrode 110 functions as the storage capacitance and also functions as the display unit at the same time, so that the storage capacitance can be secured without deteriorating the effective aperture ratio. In the present invention, the display unit is mainly in the IPS mode. With the FFS, the vertical component of the electric field is stronger compared to that of the IPS and the liquid crystal molecules rise. Thus, the viewing angle property thereof is deteriorated than that of the IPS. Therefore, there is a tendency that the "shift" in the gradation-standardized transmittance curve regarding the transmittance when observing from the oblique directions becomes greater than the case of observing from the front.

Figure 2:
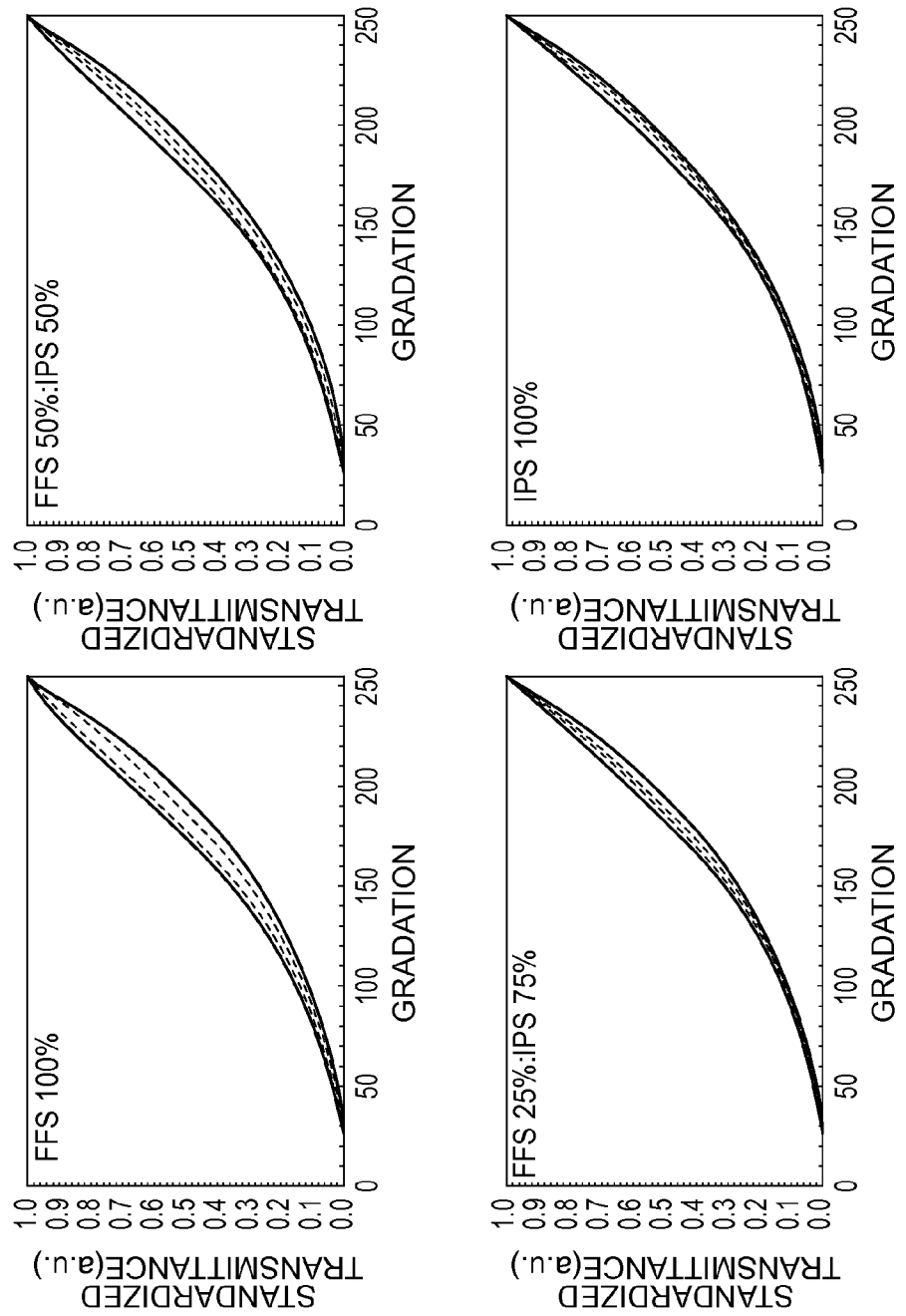
FIG. 2 shows graphs of the result of simulations regarding the horizontal direction viewing angle dependency of γ curve when the area ratio of the IPS mode and the FFS mode in the pixel region of the pixel is changed in the liquid crystal display device shown in FIG. 1.

FIG. 2 shows graphs of the result of simulations regarding the horizontal direction viewing angle dependency of the gradation-standardized transmittance γ curve when the area ratio of the IPS mode and the FFS mode in the pixel region of the pixel 100 is changed in the liquid crystal display device 10 shown in FIGS. 1A-1C. FIG. 2 shows the results acquired by calculating the shift in the gradation-standardized transmittance γ curve for the viewing angles of 0 to 80 degrees in each of the four cases where the ratios of the areas of the FFS mode and the IPS mode are "100:0", "50:50", "25:75", and "0:100", respectively. The lowermost solid line is the case of the viewing angle 0 degree, i.e., case of observing from the front side. When the viewing angle is increased as 20 degrees (dotted line), 40 degrees (dotted line), 60 degrees (dotted line), and 80 degrees (uppermost solid line), the gradation-transmittance curve changes upwards accordingly.

Naturally, the shift in the gradation-standardized transmittance curve is large in the case where the FFS mode:IPS mode is "100:0", and the shift becomes smaller as the proportion of the IPS mode is increased. The shift of the case where the FFS mode:IPS mode is "25:75" becomes almost equivalent to the case of "0:100". That is, by setting the second region that is in the FFS mode to be ¼ or less than the entire display unit area, it is possible to acquire almost the same viewing angle property as that of the case where the IPS mode is 100%.

In this exemplary embodiment, the area of the second region 100*b* within a pixel is set to be about 15% of the sum of the first region 100*a* and the second region 100*b*. Thereby, with the second region 100*b*, the storage capacitance can be secured sufficiently while increasing the transmittance. Also, through increasing the proportion of the first region 100*a*, a fine viewing angle property can be acquired. This makes it possible to acquire the lateral electric field type liquid crystal display device with the excellent transmittance as well as the fine viewing angle property.

With the liquid crystal display device which is driven by the lateral electric field in general, the initial alignment direction of the liquid crystal molecules is tilted with respect to the direction to which the electric field is applied in order to fix the rotating directions of the liquid crystal molecules. When the tilt angle is changed, the electro-optic property of the liquid crystal display device becomes changed. Thus, the tilt angle is determined in such a manner that the electro-optic property becomes optimum. Further, the optimum tilt angle varies for the IPS mode and the FFS mode.

With the present invention, it is possible to optimize the tilt angles for each of the modes and increase the effective aperture ratio through changing the angles of the extending directions of the electrodes formed linearly in the first region and the second region without changing the initial alignment directions of the liquid crystal molecules defined by rubbing processing or the like in the first region 100*a* and the second region 100*b*. In this exemplary embodiment, the angle between the initial alignment direction of the liquid crystal molecules and the extending direction of the linearly formed electrode is 15 degrees in the first region 100*a* that is in the IPS mode and 8 degrees in the second region 100*b* that is in the FFS mode.

The border line between the first region 100*a* and the second region 100*b* is set in the direction in parallel to the scan signal wiring. When the initial alignment direction is aligned for the IPS mode side, the angle with respect to the extending direction of the electrode formed linearly in the first region 100*a* is 90 degrees and the angle with respect to the extending direction of the electrode formed linearly in the second region 100*b* is 83 degrees. On both sides of the border line, the angles with respect to the extending directions of the electrodes in the both regions, the space and width of the electrodes, the number of electrodes, and the like can be designed individually. Therefore, it is possible to achieve both the transmittance and the viewing angles.

As an exemplary advantage according to the invention, the present invention employs the structure in which each of the pixels is divided into the first region that is in the IPS mode and the second region that is in the FFS mode, and the second region functions both as the display unit and the storage capacitance. Thus, the storage capacitance can be secured without decreasing the aperture ratio. This makes it possible to provide a lateral electric field type liquid crystal display device which exhibits such an excellent characteristic that the wide viewing angles and the high luminance can both be achieved.

Second Exemplary Embodiment

In a liquid crystal display device 20 according to a second exemplary embodiment of the present invention, the positions of the first and the second region in each pixel in terms of the upper side and lower side are switched compared to the case of the first exemplary embodiment. With this structure, it is also possible to acquire the same effect as that of the first exemplary embodiment.

Hereinafter, this will be described in more details.

Figure 3A:
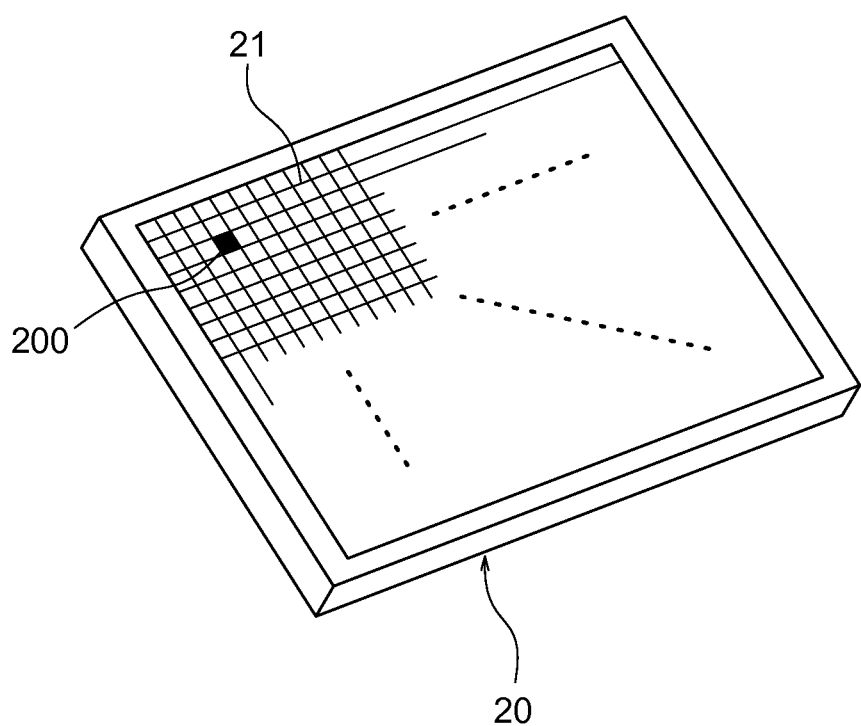
FIG. 3A is an explanatory chart showing the external appearance of a liquid crystal display device according to a second exemplary embodiment of the present invention.
Figure 3B:
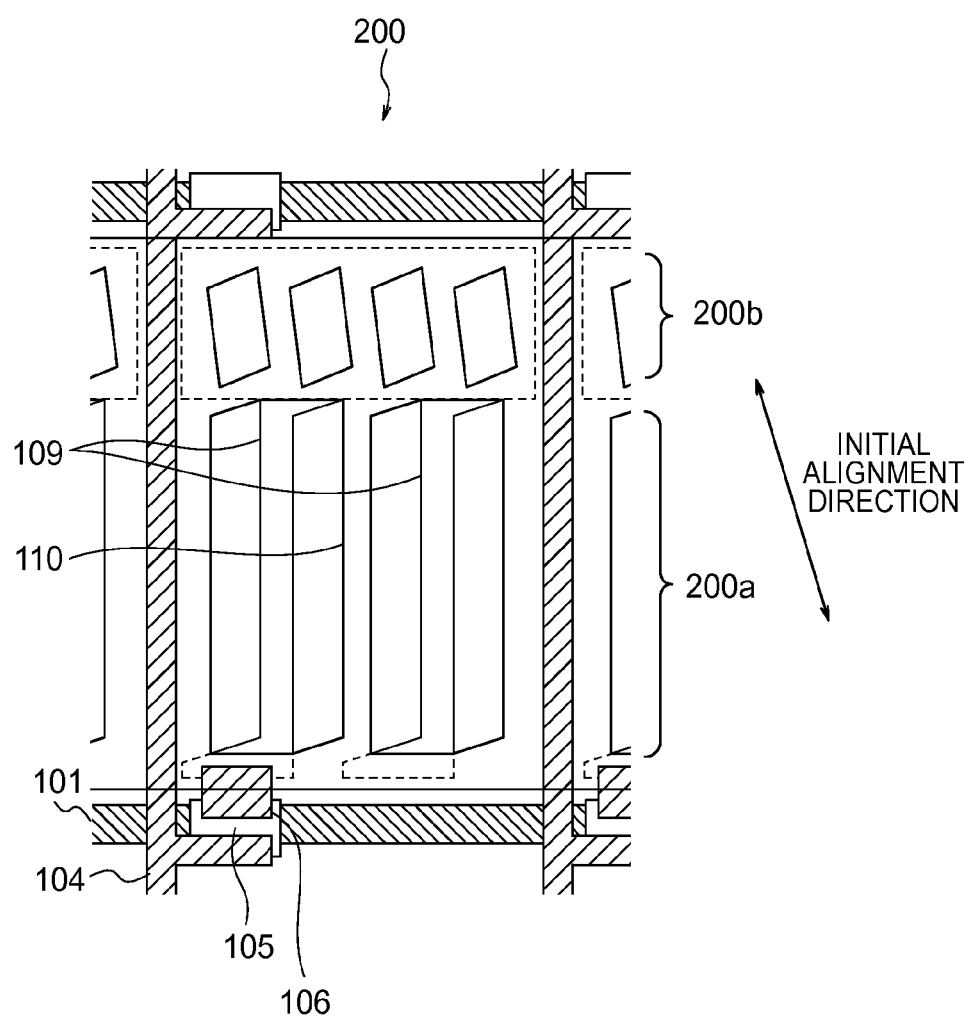
FIG. 3B is an enlarged plan view of a pixel of the liquid crystal display device according to the second exemplary embodiment of the present invention.

FIGS. 3A and 3B show the structure of the liquid crystal display device 20 according to the second exemplary embodiment of the present invention. The liquid crystal display device 20 includes a liquid crystal display panel 21, and a great number of pixels 200 are arranged in matrix on the liquid crystal display panel 21. FIG. 3A shows the external appearance of the liquid crystal display device 20, and FIG. 3B is an enlarged plan view of the pixel 200. In this pixel 200, a first region 200*a* that is in the IPS mode is on the lower side, and a second region 200*b* that is in the FFS mode is on the upper side. The sectional view of each pixel is the same as that of the first exemplary embodiment (FIG. 1C). Further, a great number of same elements as those of the first exemplary embodiment are contained, so that same names and reference numerals are applied to the same elements and explanations thereof are omitted.

That is, compared to the case of the first exemplary embodiment, the upper side and lower side positions of the first and second regions are simply switched. The same effect as that of the first exemplary embodiment can be achieved with this structure as well. The upper and lower side positions of the first and second regions may be switched as appropriate depending on the design, manufacture, and the like.

Third Exemplary Embodiment

In a liquid crystal display device 30 according to a third exemplary embodiment of the present invention, the positions of a pixel electrode 309 and a common electrode 310 are switched in terms of the upper side and the lower side compared to the case of the first exemplary embodiment. With this structure, it is also possible to acquire the same effect as that of the first exemplary embodiment.

Hereinafter, this will be described in more details.

Figure 4A:
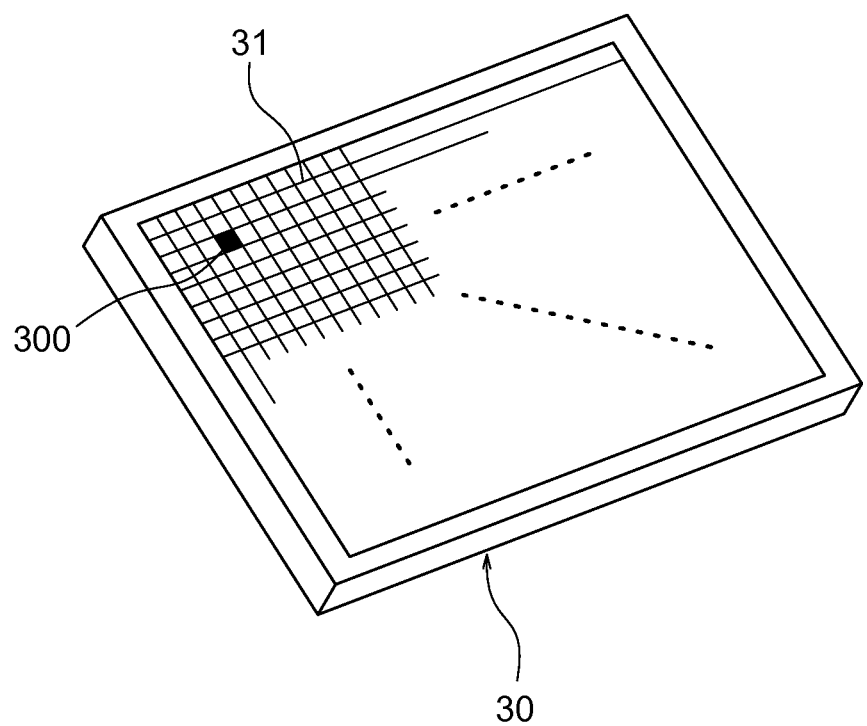
FIG. 4A is an explanatory chart showing the external appearance of a liquid crystal display device according to a third exemplary embodiment of the present invention.
Figure 4B:
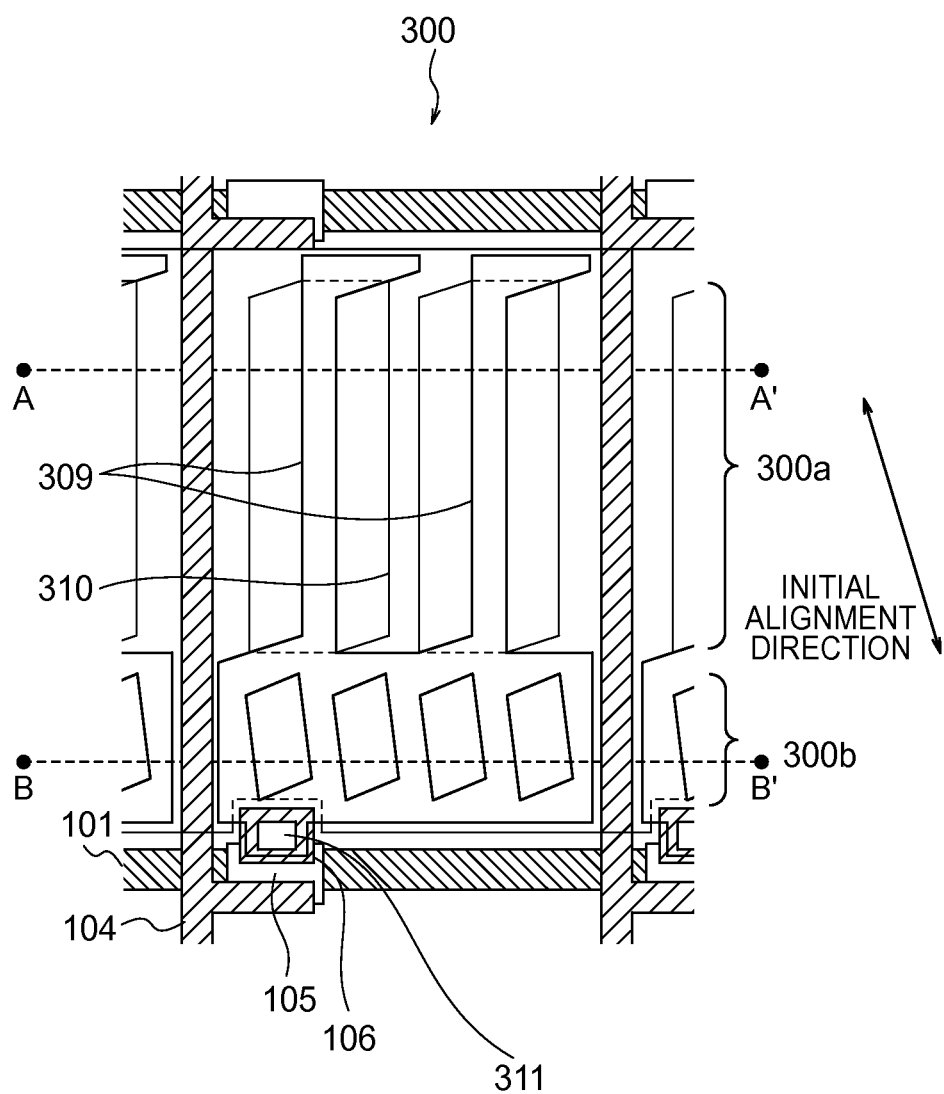
FIG. 4B is an enlarged plan view of a pixel of the liquid crystal display device according to the third exemplary embodiment of the present invention.
Figure 4C:
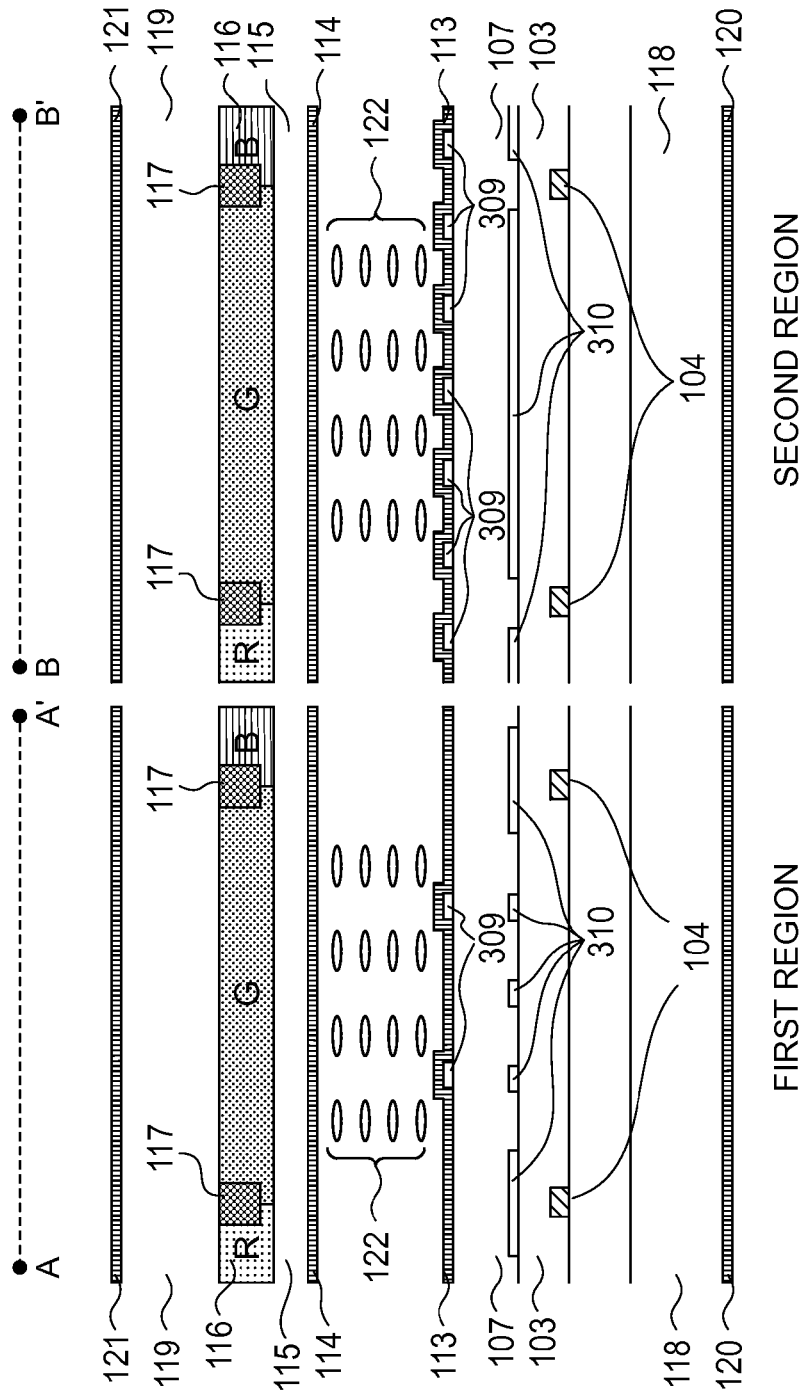
FIG. 4C is a sectional view taken along a line A-A' and a line B-B' of FIG. 4B.

FIGS. 4A-4C show the structure of the liquid crystal display device 30 according to the third exemplary embodiment of the present invention. The liquid crystal display device 30 includes a liquid crystal display panel 31, and a great number of pixels 300 are arranged in matrix on the liquid crystal display panel 31. FIG. 4A shows the external appearance of the liquid crystal display device 30, and FIG. 4B is an enlarged plan view of the pixel 300. FIG. 4C is a sectional view taken along the line A-A' (the first region 300a) and along the line B-B' (the second region 300b) of FIG. 4B.

The difference of the liquid crystal display device 30 according to the third exemplary embodiment with respect to the first and second exemplary embodiments is that the pixel electrode 309 is formed on the upper layer of the common electrode 310. Other than that, a great number of same elements as those of the first and second exemplary embodiments are contained. Thus, same names and reference numerals are applied to the same elements, and explanations thereof are omitted.

The manufacture steps thereof will be described. First, the scan signal wirings 101 constituted with a first metal layer are formed by stacking an alloy having molybdenum as the main component and an alloy having aluminum as the main component on the first glass substrate 118. After forming a silicon nitride film as a first insulating film 103 thereon, the thin film transistor 105 is formed. The steps heretofore are the same as those of the first and second exemplary embodiments.

As a second metal layer, the video signal wiring 104 and the source electrode 106 of the thin film transistor are formed thereon by a metal layer in which an alloy having molybdenum as the main component and an alloy having aluminum as the main component are stacked.

Further, an n-type semiconductor layer is formed on the upper layer of the thin film transistor 105. The n-type semiconductor layer in the areas other than the source/drain electrode is removed by dry etching after forming the electrodes made with a second metal layer. Further, the second insulating film 107 made with silicon nitride is formed thereon.

Then, the common electrode 310 is formed by using a transparent conductive film such as ITO. The common electrode 310 is in a linear shape in the first region 300a on the upper side and it is in a plan shape in the second region 300b on the lower side. Further, the common electrode 310 is formed to cover the video signal wiring 104 in the width direction to shield the electric field from the video signal wiring 104. Further, a third insulating film 308 made with an acryl resin, for example, is formed thereon.

Then, the pixel electrode 309 is formed by using a transparent conductive film such as ITO. The pixel electrode 309 is in a linear shape in the first region 300a on the upper side and disposed alternately with the common electrode 310. In the second region 300b on the lower side, the linear pixel electrode 309 overlaps with the plan-shape common electrode 310. The pixel electrode 309 is electrically connected to the source electrode 106 via a contact hole 311. The second substrate is the same as those of the first and second exemplary embodiments.

With the above-described structure, it is also possible to form the first region 300a on the upper side as the IPS mode and the second region 300b on the lower side as the FFS mode as in the cases of the first and second exemplary embodiments and to acquire the same effects as those of the first and second exemplary embodiments without a question. It is not necessarily essential for the common electrode 310 to be on the upper layer than the pixel electrode 309. The pixel electrode 309 may be formed as the upper layer.

Fourth Exemplary Embodiment

In a liquid crystal display device 40 according to a fourth exemplary embodiment of the present invention, each pixel is divided on the left and right sides as the first and second regions compared to the case of the first exemplary embodiment. With this structure, it is also possible to acquire the same effect as that of the first exemplary embodiment.

Hereinafter, this will be described in more details.

Figure 5A:
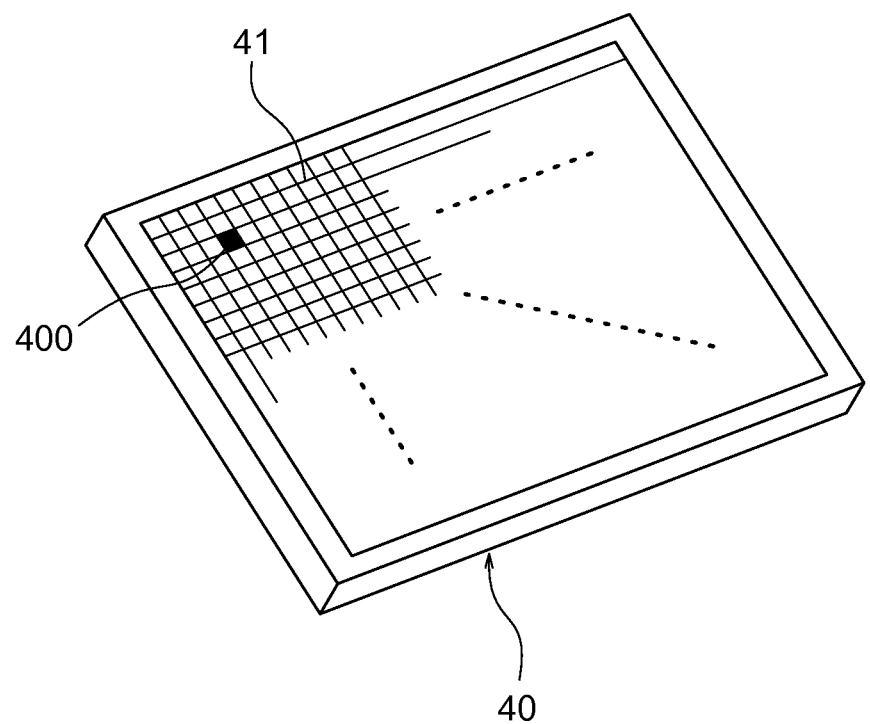
FIG. 5A is an explanatory chart showing the external appearance of a liquid crystal display device according to a fourth exemplary embodiment of the present invention.
Figure 5B:
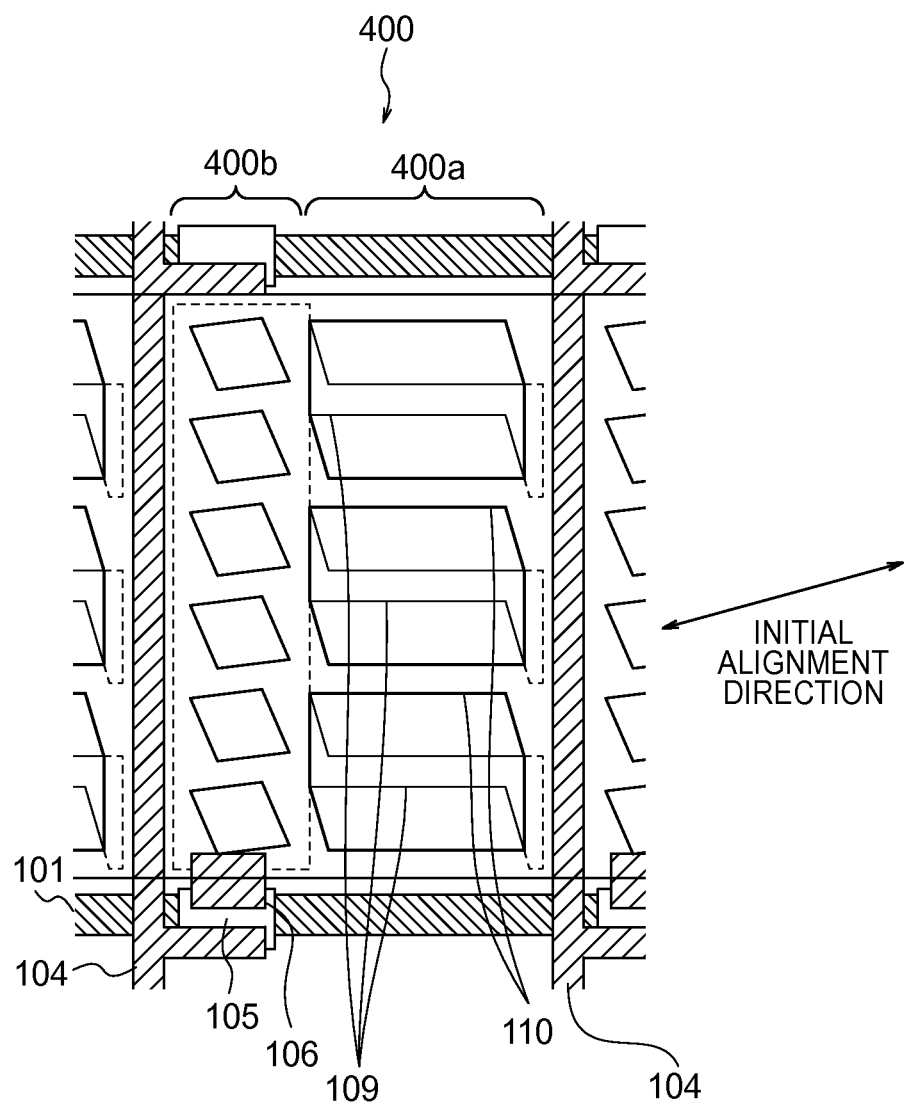
FIG. 5B is an enlarged plan view of a pixel of the liquid crystal display device according to the fourth exemplary embodiment of the present invention.

FIGS. 5A and 5B show the structure of the liquid crystal display device 40 according to the fourth exemplary embodiment of the present invention. The liquid crystal display device 40 includes a liquid crystal display panel 41, and a great number of pixels 400 are arranged in matrix on the liquid crystal display panel 41. FIG. 5A shows the external appearance of the liquid crystal display device 40, and FIG. 5B is an enlarged plan view of the pixel 400. In this pixel 400, a first region 400a is on the right side, and a second region 400b that is in the FFS mode is on the left side. The sectional view of each pixel is the same as that of the first exemplary embodiment (FIG. 1C). Further, a great number of same elements as those of the first exemplary embodiment are contained so that same names and reference numerals are applied to the same elements and explanations thereof are omitted.

Depending on the design, there may be cases where it is advantageous to set the initial alignment direction of the liquid crystal molecules substantially as the horizontal direction. In such case, the first region and the second region may be divided on the left and right sides of the pixel 400 as in the case of the liquid crystal display device 40. With this, it is also possible to acquire the same effect as that of the first exemplary embodiment. Needless to mention that the first and the second region may be disposed by reversing them in the positions on the left and right sides as in the case of the second exemplary embodiment. Further, the pixel electrode may be disposed as the upper layer as in the case of the third exemplary embodiment.

Fifth Exemplary Embodiment

In a liquid crystal display device 50 according to a fifth exemplary embodiment of the present invention, a second region 500b is structured not to function as the display unit but to function only as the storage capacitance compared to the case of the first exemplary embodiment. With this structure, it is also possible to acquire the same effect as that of the first exemplary embodiment.

Hereinafter, this will be described in more details.

Figure 6A:
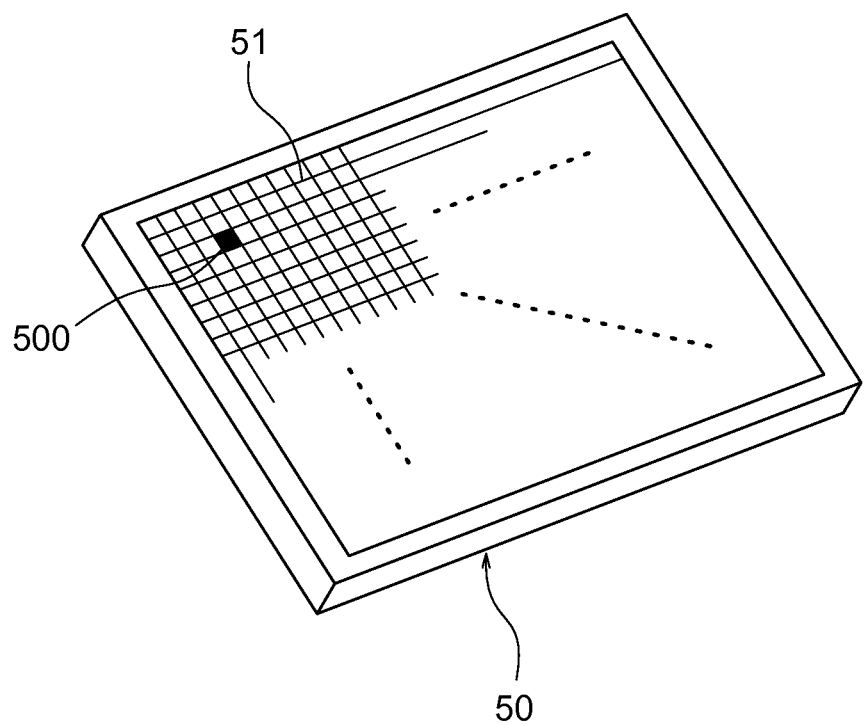
FIG. 6A is an explanatory chart showing the external appearance of a liquid crystal display device according to a fifth exemplary embodiment of the present invention.
Figure 6B:
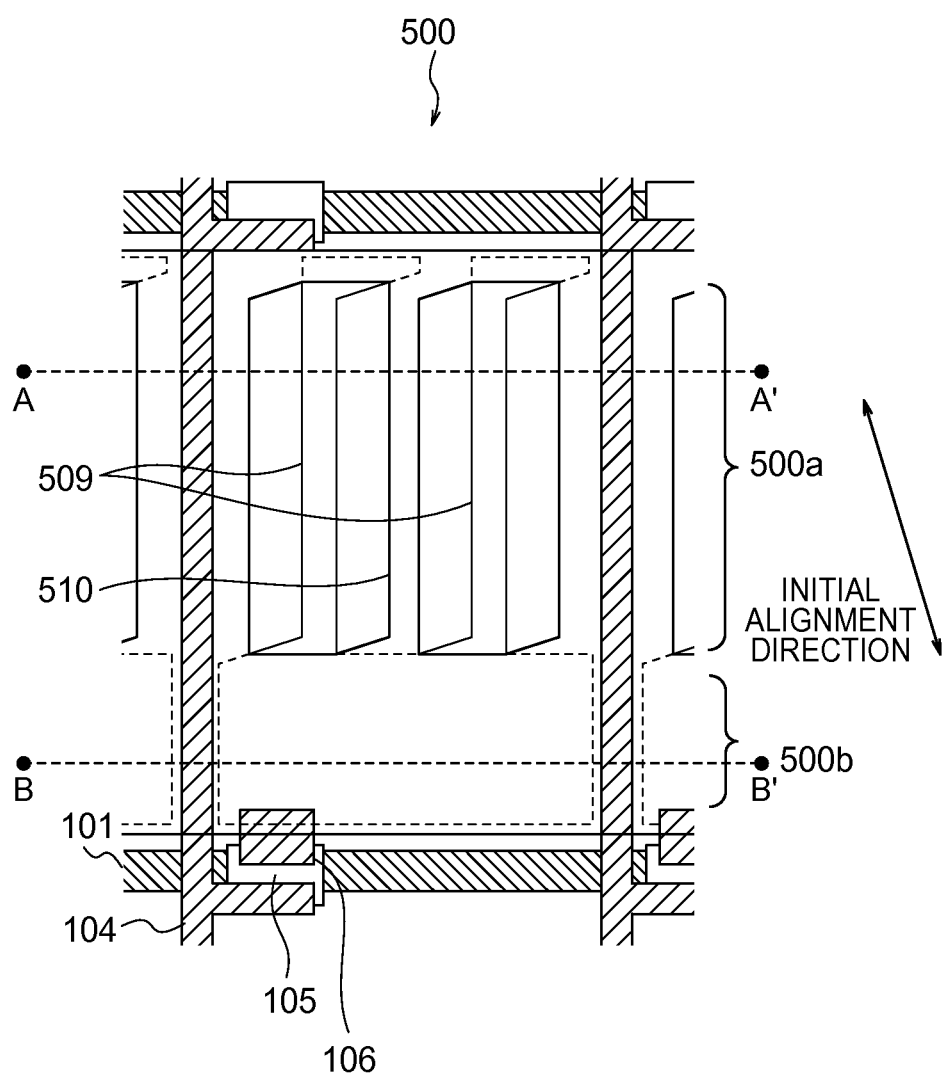
FIG. 6B is an enlarged plan view of a pixel of the liquid crystal display device according to the fifth exemplary embodiment of the present invention.
Figure 6C:
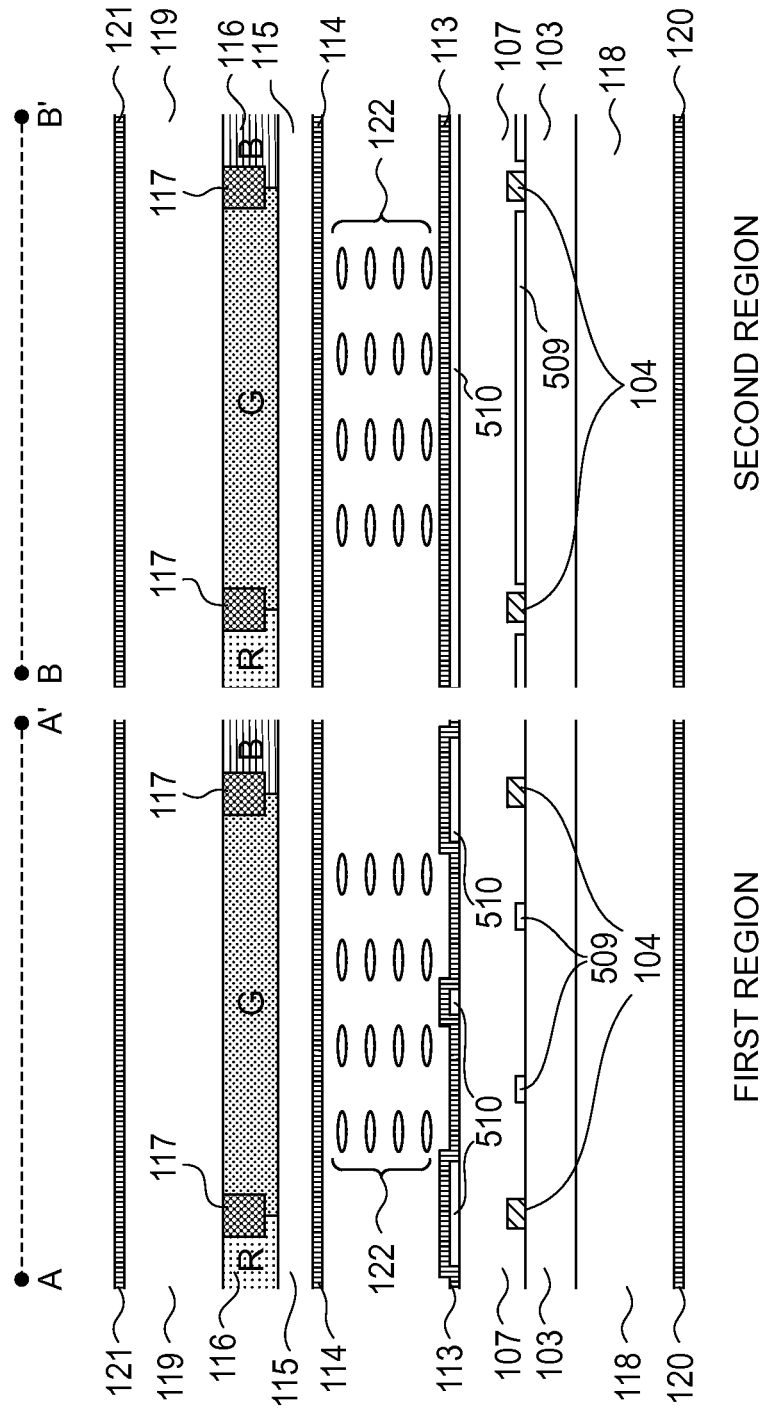
FIG. 6C is a sectional view taken along a line A-A' and a line B-B' of FIG. 6B.

FIGS. 6A-6C show the structure of the liquid crystal display device 50 according to the fifth exemplary embodiment of the present invention. The liquid crystal display device 50 includes a liquid crystal display panel 51, and a great number of pixels 500 are arranged in matrix on the liquid crystal display panel 51. FIG. 6A shows the external appearance of the liquid crystal display device 50, and FIG. 6B is an enlarged plan view of the pixel 500. FIG. 6C is a sectional view taken along the line A-A' (the first region 500a) and along the line B-B' (the second region 500b) of FIG. 6B. In FIGS. 6A-6C, a great number of same elements as those of the first to fourth exemplary embodiments are contained so that same names and reference numerals are applied to the same elements and explanations thereof are omitted.

The difference of the liquid crystal display device 50 according to the fifth exemplary embodiment with respect to those of the first to fourth exemplary embodiment is that a common electrode 510 in the second region 500b is not formed in a linear shape but formed in a plan shape. Therefore, the second region 500b does not function as the display unit but function only as the storage capacitance. However, it is possible to secure the sufficient aperture ratio with the first region 500a alone, so that the second region 500b may be used only as the storage capacitance and the upper side electrode (the common electrode 510) does not need to be formed linearly.

Further, since the second region 500b is used only as the storage capacitance, a larger storage capacitance can be secured with a smaller area than the case of the related technique 1. Thus, the area of the second region 500b can be decreased further, so that a sufficiently higher aperture ratio can be acquired than the case of the related technique 1. Needless to mention that the first region and the second region may be disposed in the reversed positions on the upper side and the lower side as in the case of the second exemplary embodiment or may be disposed on the left and right sides as in the case of the fourth exemplary embodiment. Further, the pixel electrode may be formed as the upper layer as in the case of the third exemplary embodiment.

Sixth Exemplary Embodiment

A liquid crystal display device 60 according to a sixth exemplary embodiment of the present invention employs a structure in which there are parts where the edge of the electrode formed linearly in a first region 600a and the edge of the electrode formed linearly in a second region 600b are formed continuously compared to the case of the first exemplary embodiment. With this structure, it is also possible to acquire the same effect as that of the first exemplary embodiment. Further, through promoting the rotation of the liquid crystal molecules in the border regions, it is possible to acquire an effect of achieving high luminance.

Hereinafter, this will be described in more details.

Figure 7A:
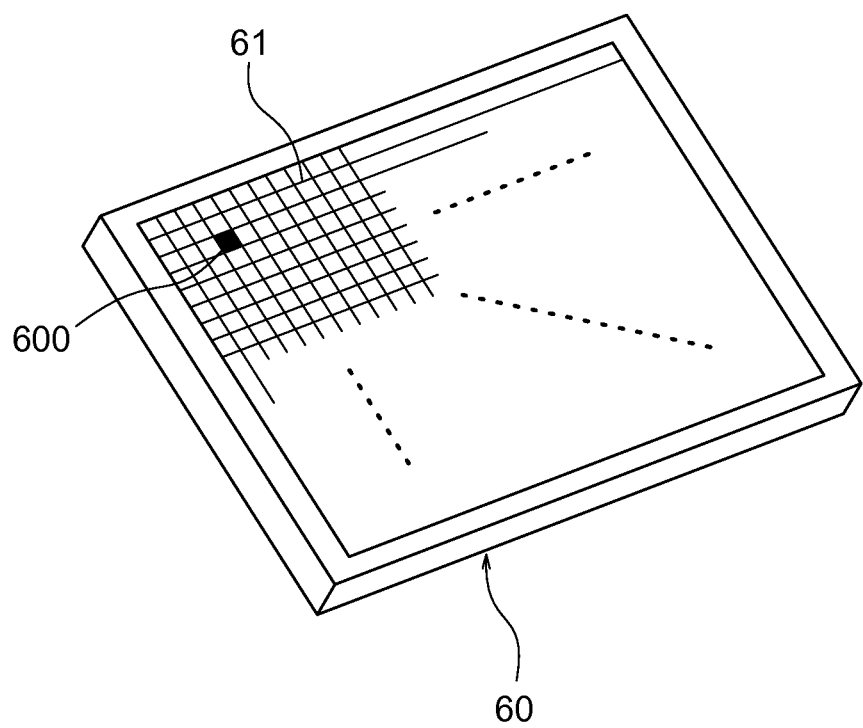
FIG. 7A is an explanatory chart showing the external appearance of a liquid crystal display device according to a sixth exemplary embodiment of the present invention.
Figure 7B:
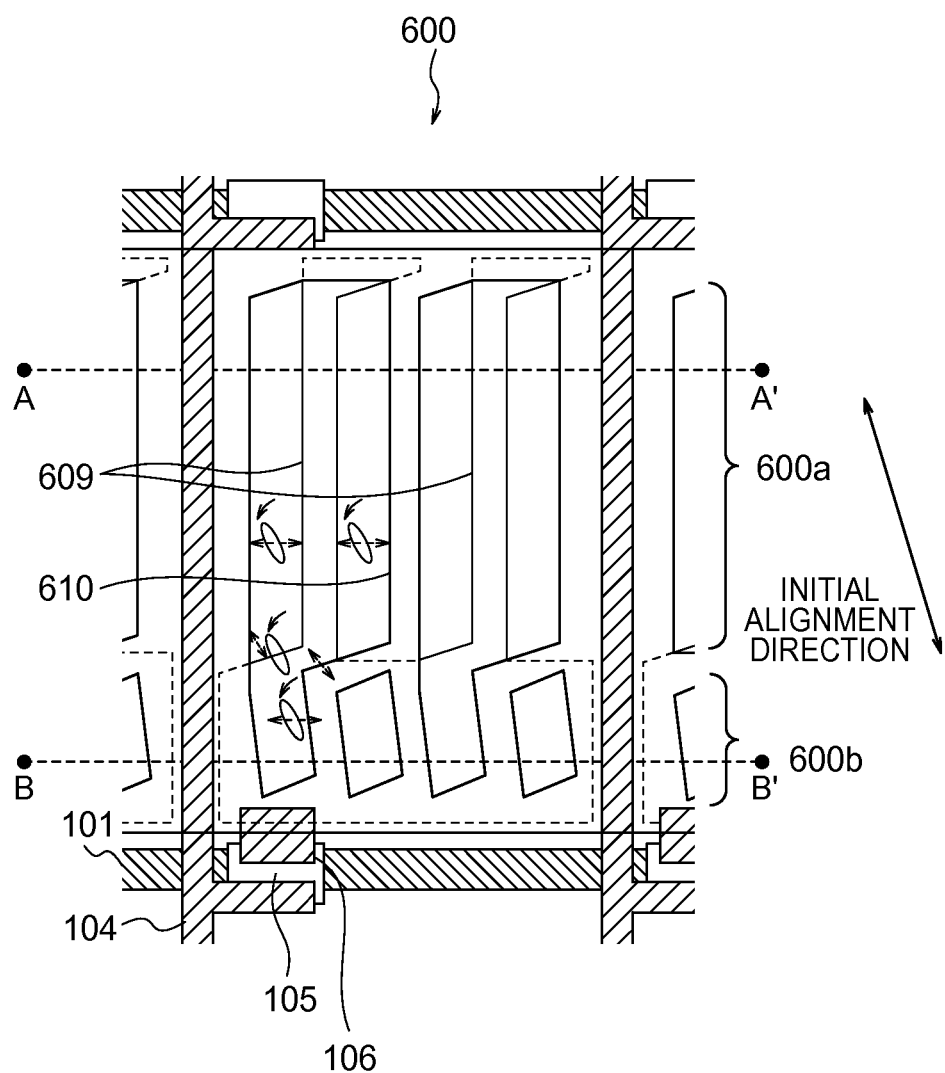
FIG. 7B is an enlarged plan view of a pixel of the liquid crystal display device according to the sixth exemplary embodiment of the present invention.

FIGS. 7A and 7B show the structure of the liquid crystal display device 60 according to the sixth exemplary embodiment of the present invention. The liquid crystal display device 60 includes a liquid crystal display panel 61, and a great number of pixels 600 are arranged in matrix on the liquid crystal display panel 61. FIG. 7A shows the external appearance of the liquid crystal display device 60, and FIG. 7B is an enlarged plan view of the pixel 600. In FIGS. 7A and 7B, a great number of same elements as those of the first to fifth exemplary embodiments are contained so that same names and reference numerals are applied to the same elements and explanations thereof are omitted.

In this pixel 600, a part of the upper side electrode (common electrode 610) is omitted in the border region between the first region 600a and the second region 600b, and there is a part where the edge of the electrode formed linearly in the first region 600a and the edge of the electrode formed linearly in the second region 600b are continuously formed.

In FIGS. 7A and 7B, a broken-line with arrows on both sides shows an electric field which rotates the liquid crystal molecules in the forward direction. As shown in FIGS. 7A and 7B, even when the upper-layer electrode is omitted in the border between the first region and the second region, it is possible to continuously form the edge of the linear electrode on the upper layer in the second region and the edge of the linear electrode on the upper layer in the first region at the position where the lateral electric field which rotates the liquid crystal molecules in the forward direction is applied without disposing the upper-layer electrode in the border part.

With this, the liquid crystal molecules in the vicinity of the border also rotate in the forward direction and the rotation of the liquid crystal molecules in the border area is promoted as well, thereby further contributing to the increase in the aperture ratio (high luminance). Needless to mention that the first region and the second region may be disposed in the reversed positions on the upper side and the lower side as in the case of the second exemplary embodiment or may be disposed on the left and right sides as in the case of the fourth exemplary embodiment. Further, the pixel electrode may be formed as the upper layer as in the case of the third exemplary embodiment.

Seventh Exemplary Embodiment

A liquid crystal display device 70 according to a seventh exemplary embodiment of the present invention employs a structure in which the pixel electrode and common electrode formed linearly in a first region 700a are bent along with the video signal wiring. With this structure, it is not only possible to acquire the same effect as that of the first exemplary embodiment but also possible to acquire a still higher aperture ratio and wider viewing angles.

Hereinafter, this will be described in more details.

Figure 8A:
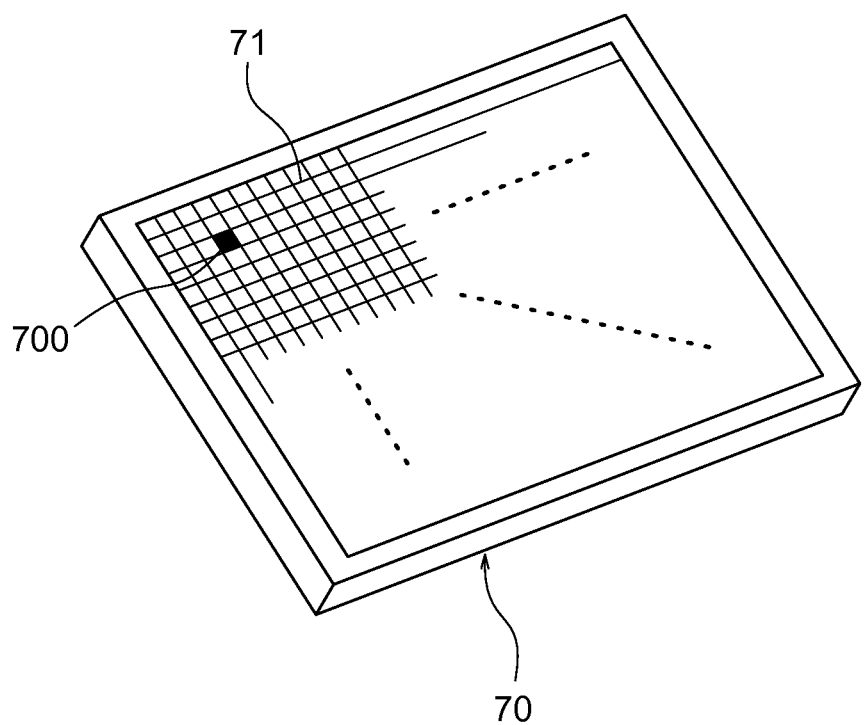
FIG. 8A is an explanatory chart showing the external appearance of a liquid crystal display device according to a seventh exemplary embodiment of the present invention.
Figure 8B:
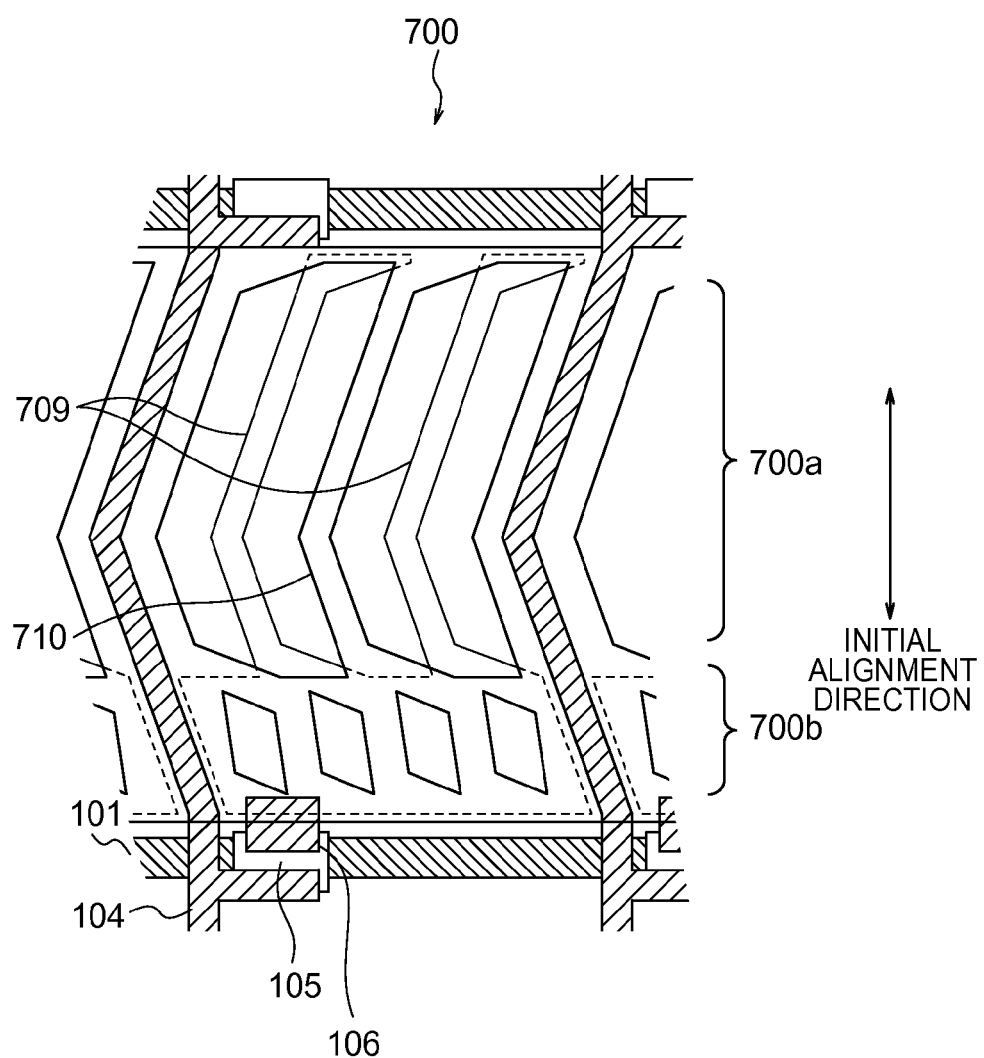
FIG. 8B is an enlarged plan view of a pixel of the liquid crystal display device according to the seventh exemplary embodiment of the present invention.

FIGS. 8A and 8B show the structure of the liquid crystal display device 70 according to the seventh exemplary embodiment of the present invention. The liquid crystal display device 70 includes a liquid crystal display panel 71, and a great number of pixels 700 are arranged in matrix on the liquid crystal display panel 71. FIG. 8A shows the external appearance of the liquid crystal display device 70, and FIG. 8B is an enlarged plan view of the pixel 700.

This pixel 700 is bent in the center part of the display region. The structure thereof is the same as those of the first to sixth exemplary embodiments. In FIGS. 8A and 8B, a great number of same elements as those of the first to sixth exemplary embodiments are contained so that same names and reference numerals are applied to the same elements and explanations thereof are omitted.

In general, a pixel of a liquid crystal display device is often constituted with three kinds of sub-pixels corresponded to a color filter which corresponds to three primary colors RGB, and it is often formed long in the extending direction of the video signal wiring and formed short in the extending direction of the scan line. Thus, in such case, the electrodes can be disposed efficiently through bending the electrodes formed linearly in the first region along with the video signal wiring, and the aperture ratio can be increased. In that case, the border between the first region and the second region may be disposed in parallel to the scan signal wiring.

With such shape, the rotation directions of the liquid crystal molecules become inverted for the upper part and the lower part of the pixel by having the bent part as a boundary. Therefore, the viewing angle property can be compensated between the two regions where the rotation directions are different from each other. That is, it becomes possible to achieve still wider viewing angles.

Eighth Exemplary Embodiment

A liquid crystal display device 80 according to an eighth exemplary embodiment of the present invention employs a structure in which the number of pixel electrodes formed linearly in a first region 800*a* and the number of pixel electrodes formed linearly in a second region 800*b* are different. With this structure, it is not only possible to acquire the same effect as that of the first exemplary embodiment but also possible to optimize the first and second regions separately. Hereinafter, this will be described in more details.

Figure 9A:
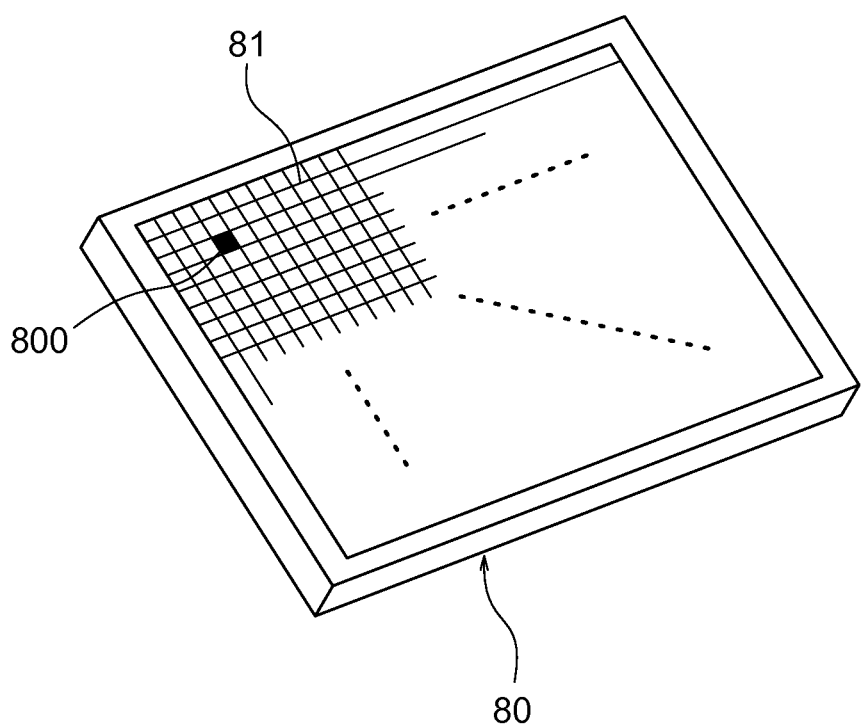
FIG. 9A is an explanatory chart showing the external appearance of a liquid crystal display device according to an eighth exemplary embodiment of the present invention.
Figure 9B:
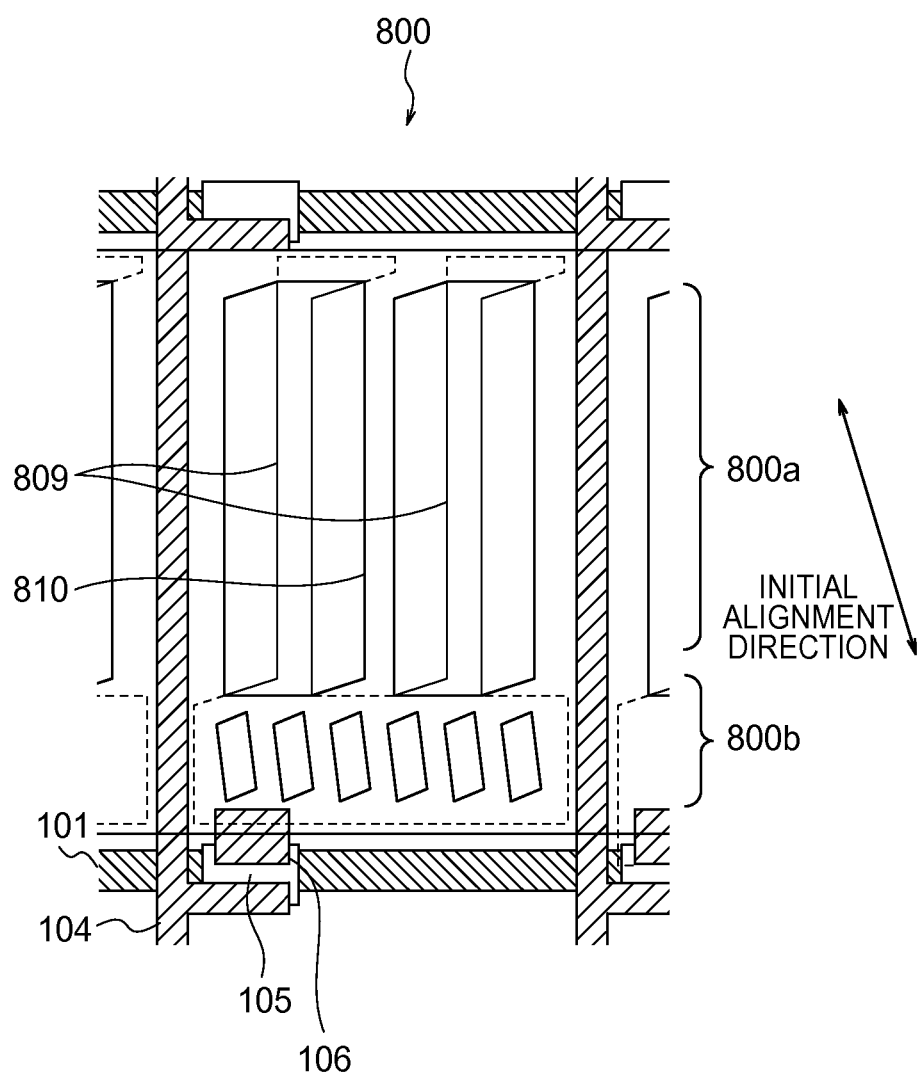
FIG. 9B is an enlarged plan view of a pixel of the liquid crystal display device according to the eighth exemplary embodiment of the present invention.

FIGS. 9A and 9B show the structure of the liquid crystal display device 80 according to the eighth exemplary embodiment of the present invention. The liquid crystal display device 80 includes a liquid crystal display panel 81, and a great number of pixels 800 are arranged in matrix on the liquid crystal display panel 81. FIG. 9A shows the external appearance of the liquid crystal display device 80, and FIG. 9B is an enlarged plan view of the pixel 800. In FIGS. 9A and 9B, a great number of same elements as those of the first to seventh exemplary embodiments are contained so that same names and reference numerals are applied to the same elements and explanations thereof are omitted.

In this pixel 800, the number of the linear electrodes in a first region 800*a* that is in the IPS mode and the number of the linear electrodes (common electrodes 810) in a second region 800*b* that is in the FFS mode are different. The structure thereof is the same as those of the first to sixth exemplary embodiment.

That is, the electric field generating mechanisms are different in the first region 800*a* that is in the IPS mode and in the second region 800*b* that is in the FFS mode, so that the optimum values for the electrode widths and the electrode intervals are different. In general, the latter can be in the optimum state by shortening the electrode interval in many cases. Thus, as in this exemplary embodiment, the numbers of the linear electrodes are set different for the both regions and separately determined to have the optimum electro-optic properties so as to optimize them separately. Thereby, optimization can be done separately without changing the initial alignment directions of the liquid crystal molecules in the first region and the second region.

Ninth Exemplary Embodiment

A liquid crystal display device 90 according to a ninth exemplary embodiment of the present invention is a combination of the seventh and eighth exemplary embodiments described above in which the number of electrodes formed linearly in a first region 900*a* and the number of electrodes formed linearly in a second region 900*b* are different and, further, the pixel is bent in the center part of the display area. With this structure, it is possible to acquire the effects that are the combination of each of the effects of the seventh and eighth exemplary embodiments described above. Hereinafter, this will be described in more details.

Figure 10A:
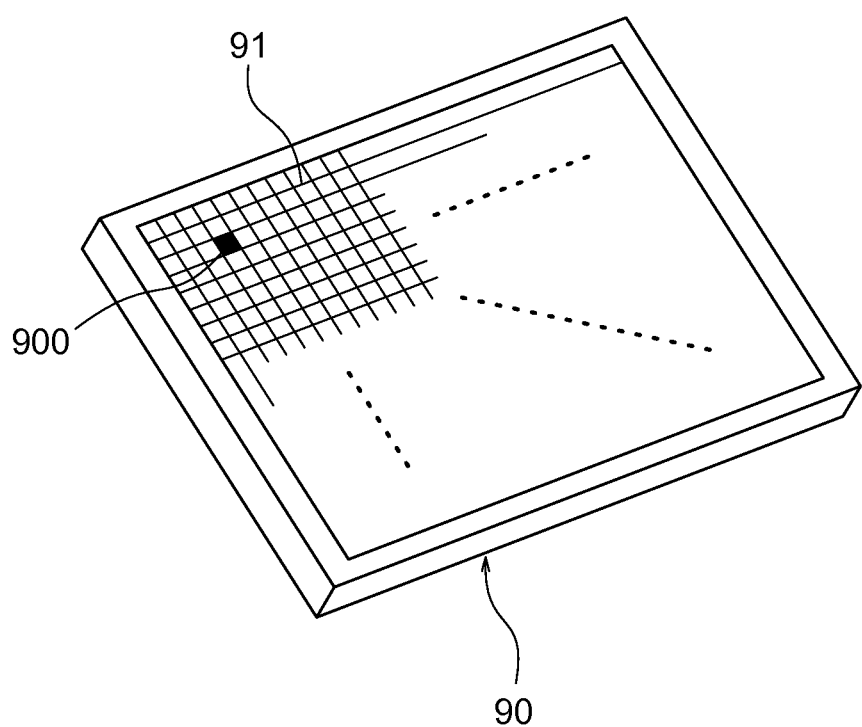
FIG. 10A is an explanatory chart showing the external appearance of a liquid crystal display device according to a ninth exemplary embodiment of the present invention.
Figure 11A:
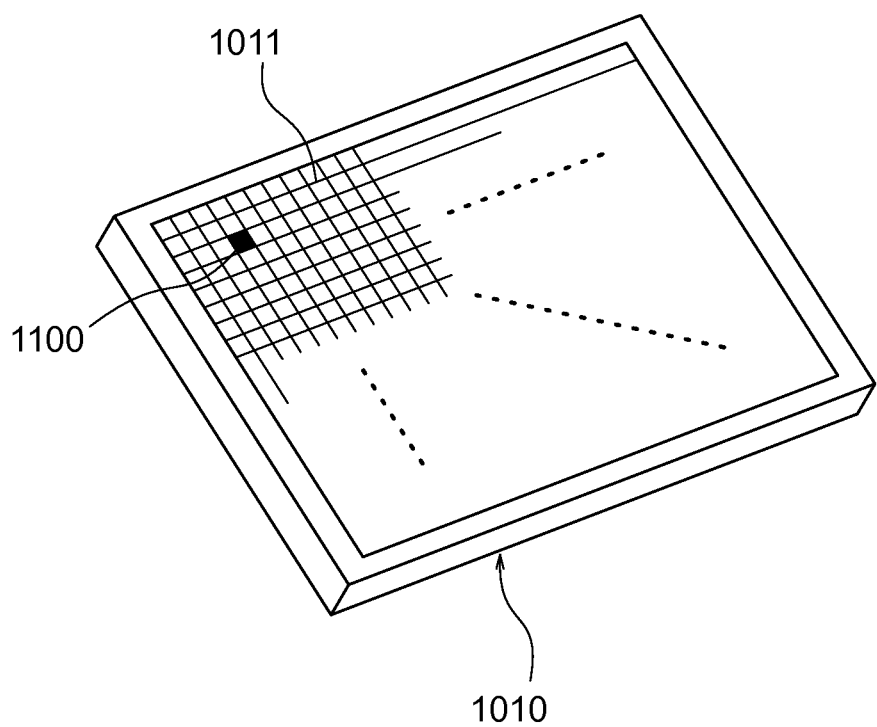
FIG. 11A is an explanatory chart showing the external appearance of an existing liquid crystal display device of the IPS mode.
Figure 11B:
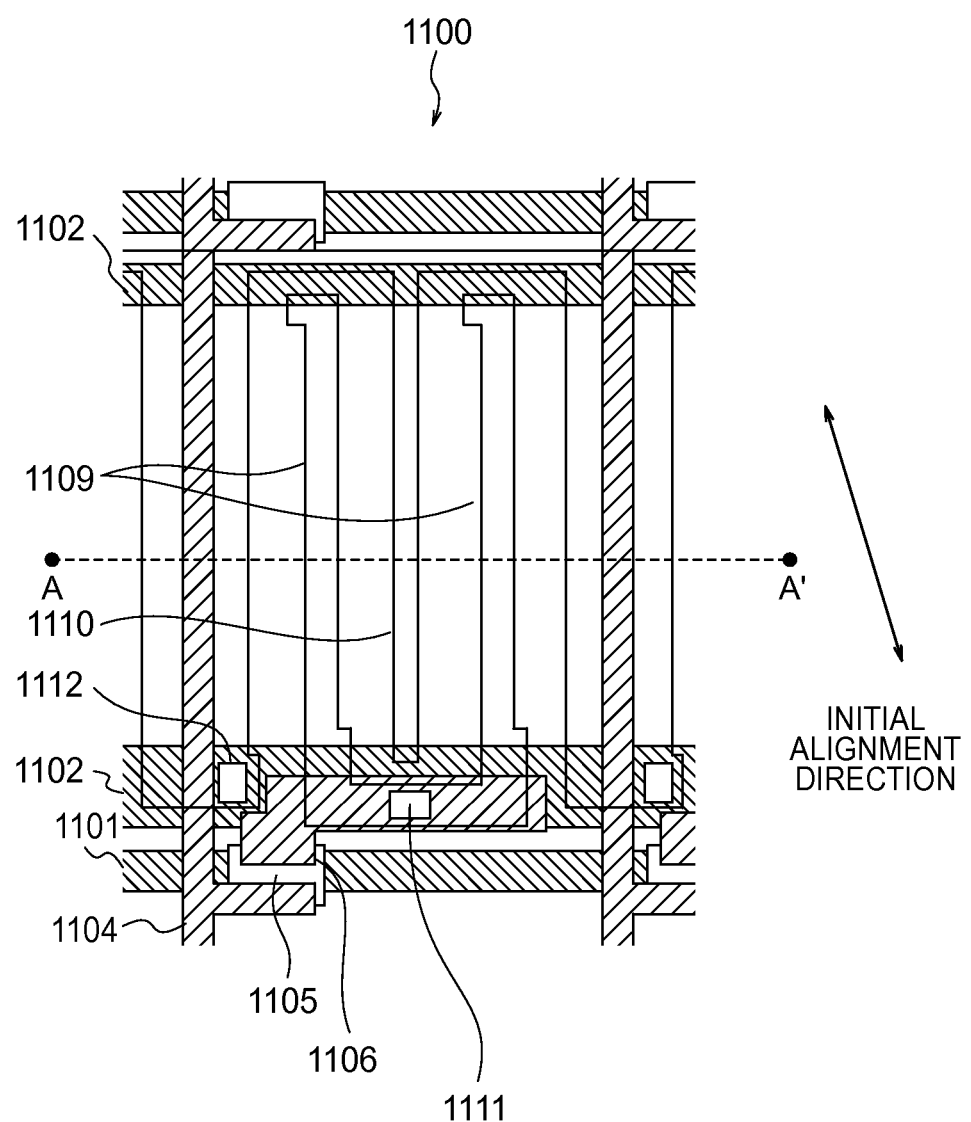
FIG. 11B is an enlarged plan view of a pixel of the existing liquid crystal display device of the IPS mode.
Figure 11C:
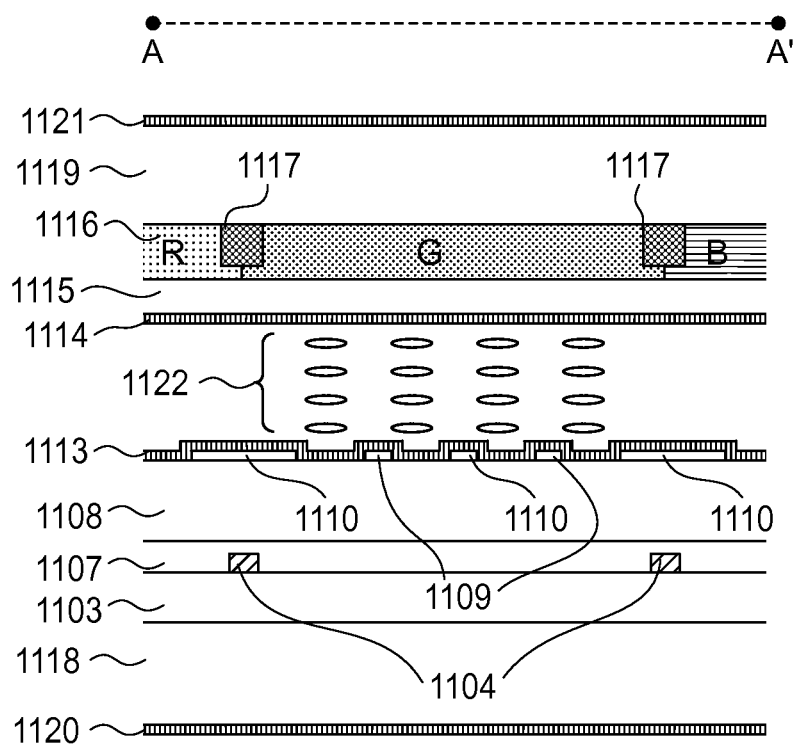
FIG. 11C is a sectional view taken along a line A-A' of FIG. 11B.

FIGS. 10A and 10B show the structure of the liquid crystal display device 90 according to the ninth exemplary embodiment of the present invention. The liquid crystal display device 90 includes a liquid crystal display panel 91, and a great number of pixels 900 are arranged in matrix on the liquid crystal display panel 91. FIG. 10A shows the external appearance of the liquid crystal display device 90, and FIG. 10B is an enlarged plan view of the pixel 900. In FIGS. 10A and 10B, a great number of same elements as those of the first to eighth exemplary embodiments are contained so that same names and reference numerals are applied to the same elements and explanations thereof are omitted.

This pixel 900 is a combination of the seventh and eighth exemplary embodiments described above. That is, the numbers of linear electrodes (common electrodes 910) are set to be different in the first region 900*a* that is in the IPS mode and the second region 900*b* that is in the FFS mode and, further, the pixel is bent in the center part of the display area. The structure thereof is the same as those of the first to sixth exemplary embodiments.

With this structure, as in the case of the seventh exemplary embodiment, the rotation directions of the liquid crystal molecules become inverted for the upper part and the lower part of the pixel by having the bent part as a boundary. Thus, it is possible to acquire still wider viewing angles. Further, as in the case of the eighth exemplary embodiment, optimization can also be done separately without changing the initial alignment direction of the liquid crystal molecules for the first region and the second region.

As described above, the ninth exemplary embodiment is a combination of the seventh and eighth exemplary embodiments. However, other combinations of each of the above-described exemplary embodiments can be employed as appropriate. Further, changes and modifications without departing from the scope and the spirit of the present invention can be applied by those skilled in the art as appropriate.

While the present invention has been described by referring to the specific exemplary embodiments shown in the drawings, the present invention is not limited only to the exemplary embodiments shown in the drawings. Any other known structures can be employed as long as the effects of the present invention can be achieved therewith.

The whole or a part of the exemplary embodiments disclosed above can be described as, but not limited to, the following supplementary notes.

(Supplementary Note 1)

A lateral electric field type liquid crystal display device, including a liquid crystal display panel including a great number of pixels arranged in matrix, which is formed by sandwiching a liquid crystal member between a first substrate and a second substrate, wherein:

a pixel electrode and a common electrode made with a transparent conductive film are formed on the first substrate via an insulating film;

each of the pixels is divided into a first region and a second region;

the pixel electrode and the common electrode formed linearly in parallel to each other in the first region rotate liquid crystal molecules in the region by a lateral electric field applied between the both electrodes; and at least the electrode on a lower layer side out of the pixel electrode and the common electrode in the second region is formed in a plan shape, and a part where the pixel electrode and the common electrode overlap with each other forms a storage capacitance.

(Supplementary Note 2)

The liquid crystal display device as depicted in Supplementary Note 1, including, on the first substrate, at least a scan signal wiring, a video signal wiring which intersects with the scan signal wiring, a thin film transistor formed near an intersection point between the scan signal wiring and the video signal wiring, and a source electrode connected to the thin film transistor, wherein the video signal wiring is covered by the common electrode in a wiring width direction via the insulating film.

(Supplementary Note 3)

The liquid crystal display device as depicted in Supplementary Note 1, wherein a border line between the first region and the second region is set in such a manner that an angle with respect to an extending direction of the linearly formed electrode in the first region and an angle with respect to an extending direction of the linearly formed electrode in the second region become different.

(Supplementary Note 4)

The liquid crystal display device as depicted in Supplementary Note 1, wherein a proportion of an area of the second region is ¼ or less than a total area of the first region and the second region.

(Supplementary Note 5)

The liquid crystal display device as depicted in Supplementary Note 1, wherein:

the electrode on a lower layer side out of the pixel electrode and the common electrode in the second region is formed in a plan shape and the electrode on an upper layer side is formed linearly to overlap on the plan-shape electrode; liquid crystal molecules are rotated by a lateral electric field applied between the both; and a part where the pixel electrode and the common electrode overlap with each other forms a storage capacitance.

(Supplementary Note 6)

The liquid crystal display device as depicted in Supplementary Note 5, wherein:

an angle formed between an extending direction of the linearly formed electrode in the first region and an initial alignment direction of the liquid crystal molecules and an angle formed between an extending direction of the linearly formed electrode in the second region and the initial alignment direction of the liquid crystal molecules are different.

(Supplementary Note 7)

The liquid crystal display device as depicted in Supplementary Note 5, wherein:

there is an area where an edge of the linearly formed electrode in the first region and an edge of the linearly formed electrode in the second region are continuously formed.

(Supplementary Note 8)

The liquid crystal display device as depicted in Supplementary Note 5, wherein:

number of the linearly formed electrodes in the first region and number of the linearly formed electrodes in the second region are different.

(Supplementary Note 9)

The liquid crystal display device as depicted in Supplementary Note 1, wherein:

the linearly formed pixel electrode and common electrode in the first region are bent along with the video signal wiring.

INDUSTRIAL APPLICABILITY

The present invention can be applied to most of apparatuses which include a liquid crystal display device. Especially, the present invention is suited for the cases where both the high luminance and the wide viewing angles are required, e.g., television receivers, mobile phones, tablet terminals, computer terminals, and game machines.

What is claimed is:

1. A lateral electric field type liquid crystal display device, comprising a liquid crystal display panel including a great number of pixels arranged in matrix, which is formed by sandwiching a liquid crystal member between a first substrate and a second substrate, wherein:

a pixel electrode and a common electrode made with a transparent conductive film are formed on the first substrate via an insulating film;

each of the pixels is divided into a first region and a second region;

the pixel electrode and the common electrode formed linearly in parallel to each other in the first region rotate liquid crystal molecules in the region by a lateral electric field applied between the both electrodes; and at least the electrode on a lower layer side out of the pixel electrode and the common electrode in the second region is formed in a plan shape, and a part where the pixel electrode and the common electrode overlap with each other forms a storage capacitance.

2. The liquid crystal display device as claimed in claim 1, comprising, on the first substrate, at least a scan signal wiring, a video signal wiring which intersects with the scan signal wiring, a thin film transistor formed near an intersection point between the scan signal wiring and the video signal wiring, and a source electrode connected to the thin film transistor, wherein the video signal wiring is covered by the common electrode in a wiring width direction via the insulating film.

3. The liquid crystal display device as claimed in claim 1, wherein a border line between the first region and the second region is set in such a manner that an angle with respect to an extending direction of the linearly formed electrode in the first region and an angle with respect to an extending direction of the linearly formed electrode in the second region become different.

4. The liquid crystal display device as claimed in claim 1, wherein a proportion of an area of the second region is ¼ or less than a total area of the first region and the second region.

5. The liquid crystal display device as claimed in claim 1, wherein:

the electrode on a lower layer side out of the pixel electrode and the common electrode in the second region is formed in a plan shape and the electrode on an upper layer side is formed linearly to overlap on the plan-shape electrode; liquid crystal molecules are rotated by a lateral electric field applied between the both; and a part where the pixel electrode and the common electrode overlap with each other forms a storage capacitance.

6. The liquid crystal display device as claimed in claim 5, wherein:

an angle formed between an extending direction of the linearly formed electrode in the first region and an initial alignment direction of the liquid crystal molecules and an angle formed between an extending direction of the linearly formed electrode in the second region and the initial alignment direction of the liquid crystal molecules are different.

7. The liquid crystal display device as claimed in claim 5, wherein:

there is an area where an edge of the linearly formed electrode in the first region and an edge of the linearly formed electrode in the second region are continuously formed.

8. The liquid crystal display device as claimed in claim 5, wherein:

number of the linearly formed electrodes in the first region and number of the linearly formed electrodes in the second region are different.

9. The liquid crystal display device as claimed in claim 1, wherein:

the linearly formed pixel electrode and common electrode in the first region are bent along with the video signal wiring.

* * * * *